(12) United States Patent
Fujikawa et al.

(10) Patent No.: US 7,898,688 B2
(45) Date of Patent: Mar. 1, 2011

(54) ELECTRO-OPTICAL DEVICE CONTROLLING DRIVING CURRENT TO EACH ELECTRO-OPTICAL ELEMENT TO ALLEVIATE VARIATION OF INTENSITY

(75) Inventors: Shinsuke Fujikawa, Chino (JP); Hiroaki Jo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1096 days.

(21) Appl. No.: 11/618,283

(22) Filed: Dec. 29, 2006

(65) Prior Publication Data

US 2007/0262934 A1 Nov. 15, 2007

(30) Foreign Application Priority Data

Jan. 11, 2006 (JP) .............................. 2006-003302
Feb. 1, 2006 (JP) .............................. 2006-024160

(51) Int. Cl.
G06F 15/00 (2006.01)
G09G 5/10 (2006.01)
(52) U.S. Cl. ....................................... 358/1.7; 345/690
(58) Field of Classification Search .................. 358/1.1, 358/1.7, 1.8, 1.9, 1.13, 1.18, 474, 400, 482; 345/76, 211, 690
See application file for complete search history.

(56) References Cited

U.S. PATENT DOCUMENTS

| 4,967,192 | A | 10/1990 | Hirane et al. |
| 5,138,310 | A | 8/1992 | Hirane et al. |
| 6,271,825 | B1 * | 8/2001 | Greene et al. ............... 345/694 |
| 6,411,306 | B1 * | 6/2002 | Miller et al. ................. 345/690 |
| 7,550,702 | B2 * | 6/2009 | Miyazawa ................... 250/205 |
| 7,593,008 | B2 * | 9/2009 | Yamada ....................... 345/204 |
| 2003/0011314 | A1 * | 1/2003 | Numao ..................... 315/169.3 |
| 2005/0207249 | A1 * | 9/2005 | Morita ........................ 365/203 |

FOREIGN PATENT DOCUMENTS

| JP | A-63-280568 | 11/1988 |
| JP | A-10-6554 | 1/1998 |
| JP | A 2005-283816 | 10/2005 |
| JP | A-2005-309422 | 11/2005 |

* cited by examiner

Primary Examiner—Gabriel I Garcia
(74) Attorney, Agent, or Firm—Oliff & Berridge, PLC

(57) ABSTRACT

An electro-optical device includes a plurality of unit circuits; a first selecting circuit that sequentially selects the plurality of unit circuits; and a first signal line through which correction data for the individual unit circuits are supplied serially. Each of the plurality of unit circuits includes an electro-optical element that exhibits an intensity corresponding to a driving current, a storage circuit that obtains correction data from the first signal line when the first selecting circuit selects the unit circuit and that stores the correction data; and a control circuit that controls the driving current supplied to the electro-optical element according to intensity data specifying the intensity exhibited by the electro-optical element and the correction data stored in the storage circuit.

9 Claims, 18 Drawing Sheets

ELECTRO-OPTICAL DEVICE CONTROLLING DRIVING CURRENT TO EACH ELECTRO-OPTICAL ELEMENT TO ALLEVIATE VARIATION OF INTENSITY

The entire disclosure of Japanese Application Nos. 2006-003302, filed Jan. 11, 2006 and 2006-024160, filed Feb. 1, 2006 are expressly incorporated by reference herein.

BACKGROUND

1. Technical Field

The invention relates to techniques for driving various electro-optical elements, such as organic light-emitting diodes (hereinafter referred to as "OLEDs").

2. Related Art

Electro-optical devices including an array of a plurality of unit circuits, each of the plurality of unit circuits including an electro-optical element and a circuit for controlling the electro-optical element, have hitherto been proposed. In an electro-optical device of this type, because of variation in the characteristics (e.g., efficiency of light emission) of the individual electro-optical elements or the characteristics (e.g., threshold voltage) of transistors constituting the individual unit circuits, variation in intensity (luminance) characteristics could occur among the individual electro-optical elements. In order to alleviate such variation in intensity characteristics, for example, JP-A-2005-283816 discloses a configuration in which intensity data (data specifying intensities) for individual electro-optical elements are corrected on the basis of correction data in driving the individual electro-optical elements.

In the configuration according to JP-A-2005-283816, however, calculating circuits for correcting the intensity data on the basis of the correction data are needed. This increases the scale of circuits provided in the peripheries of the electro-optical elements (hereinafter referred to as "peripheral circuits")

SUMMARY

An advantage of some aspects of the invention is that it is possible to alleviate variation in intensity characteristics of individual electro-optical elements while reducing the scale of peripheral circuits.

According to an aspect of the invention, there is provided a first electro-optical device. The first electro-optical device includes a plurality of unit circuits; a first selecting circuit that sequentially selects the plurality of unit circuits; and a first signal line through which correction data for the individual unit circuits are supplied serially. Each of the plurality of unit circuits includes an electro-optical element that exhibits an intensity corresponding to a driving current; a storage circuit that obtains correction data from the first signal line when the first selecting circuit selects the unit circuit and that stores the correction data; and a control circuit that controls the driving current supplied to the electro-optical element according to intensity data specifying the intensity exhibited by the electro-optical element and the correction data stored in the storage circuit.

In the configuration described above, the control circuit that controls the driving current supplied to the electro-optical element on the basis of the intensity data and the correction data is provided in each unit circuit. Thus, in principle, peripheral circuits for correcting the intensity data on the basis of the correction data are not needed. Accordingly, the scale of peripheral circuits of the electro-optical device can be reduced. Furthermore, since the storage circuit that stores the correction data is provided in each unit circuit, it is not needed to supply the correction data to the electro-optical element each time intensity data is transferred to the electro-optical element. Accordingly, compared with a configuration in which each unit circuit does not include a device that stores correction data, the amount of data that is to be transferred to the electro-optical device from outside (or the amount of data that is to be transferred to each electro-optical element) can be reduced.

In a first example configuration, the electro-optical device further includes a second selecting circuit that sequentially selects the plurality of unit circuits; and a second signal line through which intensity data for the individual unit circuits are supplied serially. In this case, each of the plurality of unit circuits includes an extracting circuit that obtains intensity data from the second signal line when the second selecting circuit selects the unit circuit, and the control circuit controls the driving current on the basis of the intensity data obtained by the extracting circuit and the correction data stored in One storage circuit. With this configuration, timings of obtaining of the correction data from the first signal line can be chosen irrespectively of timings of obtaining of the intensity data from the second signal line.

For example, the first selecting circuit selects each of the plurality of unit circuits in a first period, and the second selecting circuit selects each of the plurality of unit circuits in a second period that is different from the first period. The first period is typically a period in which the intensities of the electro-optical elements are not controlled on the basis of intensity data, such as a period immediately after power on of the electro-optical device. When the electro-optical device is used as an exposure device in an image forming apparatus (printing apparatus) that forms image on recording media, such as sheets of paper, an interval of formation of images on the recording media (i.e., a sheet interval) serves as the first period. According to the configuration described above, writing of the correction data to the storage circuit and obtaining of the intensity data by the extracting circuit are executed in different periods. This serves to prevent change in the intensity of each electro-optical element due to change in the correction data in the middle of control of the intensity of the electro-optical element.

Alternatively, the selection of each of the plurality of unit circuits by the first selecting circuit and the selection of each of the plurality of unit circuits by the second selecting circuit may be executed concurrently (e.g., refer to FIG. 9). With this configuration, writing of the correction data to the storage circuit can be executed irrespectively of obtaining of the intensity data by the extracting circuit. For example, when a DRAM is used as the storage circuit, the content (correction data) stored must be refreshed as needed. Therefore, this configuration, in which the correction data can be written to the storage circuit at an appropriate timing, is particularly suitable.

In a second example configuration, the first electro-optical device includes a second signal line through which intensity data for the individual unit circuits are supplied serially. In this case, each of the plurality of unit circuits includes an extracting circuit that obtains intensity data from the second signal line when the second selecting circuit selects the unit circuit; and a path specifying circuit that specifies either the storage circuit or the extracting circuit when the first selecting circuits selects the unit circuit. The storage circuit obtains the correction data from the first signal line and stores the correction data when the storage circuit is specified by the path specifying circuit, and the extracting circuit obtains the intensity data from the second signal line when the extracting circuit is specified by the path specifying circuit. The control circuit controls the driving current on the basis of the intensity data obtained by the extracting circuit and the correction data stored in the storage circuit. With this configuration, the first selecting circuit commonly used for the selection of a unit circuit that is to obtain correction data and the selection of a unit circuit that is to obtain intensity data. Accordingly, compared with the configuration in which selection circuits are provided separately for these purposes (e.g., the first example configuration), the configuration of the electro-optical device can be simplified, and manufacturing cost can be reduced.

In a configuration in which each unit circuit does not include a device that stores correction data, correction data and intensity data must be transferred together to each unit circuit. Thus, the timing of supplying correction data to each electro-optical element is restricted by the timing of transfer of intensity data. More specifically, correction data must be transferred in synchronization with intensity data. In contrast, according to the configuration described above, the storage circuit that stores correction data is provided in each unit circuit. Therefore, the timing of transferring correction data can be chosen irrespectively of the timing of transferring intensity data. For example, in the first example configuration, a period of the selection of each unit circuit y the first selecting circuit may be chosen to be longer than a period of the selection of each unit circuit by the second selecting circuit. By reducing the operation frequency of the first selecting circuit as described above, the configuration of the first selecting circuit can be simplified, and power consumption can be reduced. In the second example configuration, a transmission frequency of the correction data on the first signal line may be chosen to be lower than a transmission frequency of the intensity data on the second signal line.

In the configurations described above, preferably, the correction data is specified by a value of a voltage on the first signal line, the storage circuit of each of the plurality of unit circuits includes a capacitor that stores, as the correction data, the voltage on the first signal line at a time of selection of the unit circuit by the first selecting circuit, and the control circuit controls the driving current on the basis of the intensity data and the voltage stored in the capacitor. With this configuration, it is possible to specify the correction data precisely and delicately according to the voltage value on the first signal line. According to this configuration, however, it takes time for the first signal line to change from a voltage value corresponding to correction data for one unit circuit to a voltage value corresponding to correction data for another unit circuit. Thus, preferably, the first selecting circuit selects the individual unit circuits in periods with predetermined intervals. With this configuration, it is possible to avoid effect of correction data (voltage on the first signal line) stored in the storage circuit of one unit circuit on correction data stored in the storage circuit of another unit circuit.

In the first electro-optical device, preferably, the control circuit includes a current generating circuit that generates a reference current having a current value corresponding to the correction data stored in the storage circuit; and a driving unit that generates the driving current by adjusting the reference current generated by the current generating circuit to a current value corresponding to the intensity data. The current generating circuit is, for example, a current-output digital-to-analog converter (DAC). With this configuration, a driving current can be generated simply by changing the current value of the reference current generated by the current generating circuit. The driving unit is typically a driving transistor provided on a path of the reference current, the driving transistor having a gate to which a voltage corresponding to the intensity data is applied. From the viewpoint of alleviating variation in the characteristics of the driving transistors, preferably, each of the driving transistors is controlled to either turn on or turn off. The intensity data used in this configuration is, for example, 1-bit digital data specifying either a first intensity (e.g., turn on) or a second intensity (e.g., turn off) for the electro-optical element.

According to another aspect of the invention, there is provided a second electro-optical device. The second electro-optical device includes a plurality of unit circuits; and a signal line through which correction data for the individual unit circuits are supplied in a first period and through which intensity data for the individual unit circuits are supplied in a second period that is different from the first period. Each of the plurality of unit circuits includes an electro-optical element that exhibits an intensity corresponding to a driving current; a data obtaining circuit that obtains data from the signal line; a correcting circuit that generates a reference current corresponding to the correction data; a driving unit that controls the driving current supplied to the electron optical element on the basis of the intensity data and the reference current generated by the correcting circuit; and a path controlling circuit that outputs the correction data obtained by the data obtaining circuit in the first period to the correcting circuit and that outputs the intensity data obtained by the data obtaining circuit in the second period to the driving unit.

With the configuration described above, the correcting circuit that generates a reference current on the basis of the correction data is provided in each unit circuit. Thus, in principle, peripheral circuits that correct intensity data on the basis of the correction data are not needed. Accordingly, the scale of the peripheral circuits of the electro-optical device can be reduced. Furthermore, since the signal line is used commonly for transferring the correction data and for transferring the intensity data, compared with a configuration in which a line for transferring the correction data and a line for transferring the intensity data are provided separately, the configuration is simplified. For example, the correction data and the intensity data are input to the signal line from a common terminal, so that the number of terminals can be reduced compared with a configuration in which the correction data and the intensity data are input to separate terminals. Accordingly, the possibility of occurrence of defects in connection of the terminals with the outside can be reduced. This serves to improve the reliability of the electro-optical device.

The driving unit is typically a transistor provided on the path of the driving current. However, the configuration of the driving unit may be changed arbitrarily. For example, the driving unit may be implemented by a transistor provided in parallel to the electro-optical element on a path branching from the path from the correcting circuit to the electro-optical element. With this configuration, it is possible to change the ratio of the driving current that flows through the electro-optical device to the current that flows through the transistor by controlling the connection status (resistance between source and drain) of the transistor in accordance with the intensity data. Accordingly, it is possible to drive the electro-optical element to an intensity corresponding to the intensity data.

In the second electro-optical device, preferably, the correcting circuit includes a storage circuit that stores the correction data supplied from the path controlling circuit; and a current source that generates a reference current having a current value corresponding to the correction data stored in the storage circuit. With this configuration, the storage circuit that stores the correction data is provided in each unit circuit.

Since the correction data is stored in the storage circuit of each unit circuit before driving the electro-optical element, it is not needed to supply the correction data each time intensity data is transferred. Accordingly, compared with a configuration in which each unit circuit does not include a storage circuit, the amount of data that is to be transferred to the electro-optical device from the outside can be reduced.

In a more specific exemplary configuration, the correcting circuit includes a plurality of current generators respectively associated with individual bits of the correction data; and a correction-data line through which the bits of the correction data output from the path controlling circuit are supplied serially. In this case, each of the plurality of current generators includes an obtaining circuit that obtains a bit associated with the current generator among the correction data from the correction-data line; a storage circuit that stores the bit obtained by the obtaining circuit; and a current source that generates a current corresponding to the bit stored in the storage circuit. A reference current is generated by summing the currents generated by the current sources of the individual current generators.

Preferably, the second electro-optical device further includes a selecting circuit that sequentially selects the plurality of unit circuits in each of the first period and the second period. In this case, the data obtaining circuit in each of the plurality of unit circuits obtains data from the signal line when the selecting circuit selects the unit circuit, and a period of the selection of each of the plurality of unit circuits by the selecting circuit in the first period is longer than a period of the selection of each of the plurality of unit circuits by the selecting circuit in the second period. That is, the path controlling circuit of each unit circuit outputs correction data to the correcting circuit for a period longer than a period of output of intensity data to the driving unit. With this configuration, a sufficient time can be allocated so that the correcting circuit of each unit circuit can obtain correction data reliably. In a configuration in which the driving unit is implemented by a transistor having a gate controlled to a potential corresponding to the intensity data or the correction circuit includes a storage circuit and a current source, an operation for outputting correction data to the correcting circuit often causes a larger load than an operation for outputting intensity data to the driving unit. Therefore, this configuration, in which a sufficient time can be allocated for obtaining of correction data, is particularly suitable in such cases.

According to yet another aspect of the invention, there is provided a third electro-optical device. The third electro-optical device includes a plurality of circuit portions each including a first unit circuit and a second unit circuit; a first signal line through which correction data for the individual second unit circuits are supplied in a first period and through which intensity data for the individual first unit circuits are supplied in a second period that is different from the first period; and a second signal line through which correction data for the individual first unit circuits are supplied in the first period and through which intensity data for the individual second unit circuits are supplied in the second period. Each of the first unit circuits and the second unit circuits includes an electro-optical element that exhibits an intensity corresponding to a driving current; a data obtaining circuit that obtains data; a correcting circuit that generates a reference current corresponding to the correction data; a driving unit that controls the driving current supplied to the electro-optical element on the basis of the intensity data and the reference current generated by the correcting circuit; and a path controlling circuit that controls an output destination of the data obtained by the data obtaining circuit. The data obtaining circuits of the individual first unit circuits sequentially obtain data from the first signal line, and the data obtaining circuits of the individual second unit circuits sequentially obtain data from the second signal line, and, in each of the plurality of circuit portions, the path controlling circuit of the first unit circuit outputs the correction data obtained in the first period by the data obtaining circuit of the first unit circuit to the correcting circuit of the second unit circuit, and outputs the intensity data obtained in the second period by the data obtaining circuit of the first unit circuit to the driving unit of the first unit circuit, and the path controlling circuit of the second unit circuit outputs the correction data obtained in the first period by the data obtaining circuit of the second unit circuit to the correcting circuit of the first unit circuit, and outputs the intensity data obtained in the second period by the data obtaining circuit of the second unit circuit to the driving unit of the second unit circuit.

With the configuration described above, the correcting circuit that generates a reference current on the basis of the correction data is provided in each unit circuit. Thus, in principle, peripheral circuits that correct intensity data on the basis of the correction data are not needed. Accordingly, the scale of the peripheral circuits of the electro-optical device can be reduced. Furthermore, since the signal line is used commonly for transferring the correction data and for transferring the intensity data, compared with a configuration in which a line for transferring the correction data and a line for transferring the intensity data are provided separately, the configuration is simplified. For example, the correction data and the intensity data are input to the signal line from a common terminal, so that the number of terminals can be reduced compared with a configuration in which the correction data and the intensity data are input to separate terminals. Accordingly, the possibility of occurrence of defects in connection of the terminals with the outside can be reduced. This serves to improve the reliability of the electro-optical device.

Furthermore, in an exemplary configuration, in each of the plurality of circuit portions, the path controlling circuit of the first unit circuit is located opposite to the electro-optical element of the second unit circuit with respect to the correcting circuit of the second unit circuit, and the path controlling circuit of the second unit circuit is located opposite to the electro-optical element of the first unit circuit with respect to the correcting circuit of the first unit circuit. With this configuration, a line interconnecting the path controlling circuit of the first unit circuit and the correcting circuit of the second unit circuit or a line interconnecting the path controlling circuit of the second unit circuit and the correcting circuit of the first unit circuit need not be formed so as to cross the array of the electro-optical elements. Therefore, advantageously, the space that can be used to form the electro-optical elements can be increased.

Preferably, the third electro-optical device further includes a first selecting circuit that sequentially selects the first unit circuits in each of the first period and the second period; and a second selecting circuit that sequentially selects the second unit circuits in each of the first period and the second period. In this case, the data obtaining circuit of each of the first unit circuits obtains data from the first signal line when the first selecting circuit selects the first unit circuit, and the data obtaining circuit of each of the second unit circuits obtains data from the second signal line when the second selecting circuit selects the second unit circuit. With this configuration, the selection of the first unit circuits by the first selecting circuit and the selection of the second unit circuit by the second selecting circuit are executed concurrently. Accordingly, the time needed to supply correction data and intensity data for all the unit circuits can be reduced. In this configuration, timings of the selection of the individual first unit circuits by the first selecting circuit may substantially coincide with timings of the selection of the individual second unit circuits by the second selecting circuit. With this configuration, a signal defining the timings of operations of the first selecting circuit and the second selecting circuit can be used commonly for the first selecting circuit and the second selecting circuit.

The electro-optical elements used in the configurations described above are elements that change optical characteristics such as luminances or transmission factors in accordance with currents supplied thereto (i.e., current-driven electro-optical elements). The electro-optical elements used in the electro-optical devices are typically light-emitting elements (e.g., OLEDs) that emit lights at luminances corresponding to the current values of driving currents. However, the invention is also applicable to electro-optical devices that employ other types of electro-optical elements.

As the storage circuits in the configurations described above, various memory elements can be used, such as static random access memories (SRAMs) or dynamic random access memories (DRAMs). When SRAMs are used as the storage circuits, for example, when correction data is once supplied to all the unit circuits immediately after power on, advantageously, in principle, correction data need not be refreshed subsequently. On the other hand, when DRAMs are used as the storage circuit, compared with the configuration in which SRAMs are used, advantageously, the configuration of the storage circuits can be simplified (e.g., one capacitor can be used as the storage circuit).

Although peripheral circuits that correct intensity data on the basis of correction data are not needed in principle in the first to third electro-optical devices, this does not intend to exclude an electro-optical device having both a configuration for correcting a reference current on the basis of correction data in each unit circuit and a configuration in which intensity data is corrected by a peripheral circuit from the scope of the invention. In an electro-optical device in which a plurality of types of correction is executed, when at least one type of correction is executed in each unit circuit, that type of correction need not be executed by a peripheral circuit. Thus, compared with the configuration according to the related art in which all types of correction are executed by peripheral circuits, it is possible to achieve the advantage that the scale of peripheral circuits can be reduced. For example, it is possible to alleviate variation in the characteristics of individual electro-optical elements by correction in each unit circuit while executing gamma correction on intensity data by a peripheral circuit.

"A plurality of unit circuits" herein may refer to all the unit circuits of an electro-optical device or some of the unit circuits of an electro-optical device. For example, even when the unit circuits of an electro-optical device include dummy circuits (unit circuits that are used exclusively for checking or testing and that are not actually driven), if "a plurality of circuits" not including the dummy circuits satisfy the features of an aspect of the invention, obviously, the electro-optical device falls within the scope of the invention without even discussing features relating to the dummy circuits. Furthermore, for example, in the case of an electro-optical device including a plurality of electro-optical elements for different colors of display (e.g., red, green, and blue), for example, it is possible to execute correction only for electro-optical elements with a specific display color. In this case, as long as a "plurality of unit circuits" associated with the electro-optical elements with the specific display color satisfies features of an aspect of the invention, the electro-optical device falls within the scope of the invention without regardless of whether unit circuits associated with other display colors satisfies the features.

The electro-optical devices according to the configurations described above can be used in various electronic apparatuses. A typical example of such an electronic apparatus is an image forming apparatus in which an electro-optical device according to an aspect of the invention is used as an exposure device (optical head). The image forming apparatus includes an image carrier having an image forming surface on which a latent image is formed by exposure, an electro-optical device according to an aspect of the invention, which exposes the image forming surface, and a developing unit that forms a visible image by attaching a developing agent (e.g., toner) to the latent image. However, possible applications of electro-optical devices according to aspects of the invention are not limited to exposure. For example, it is possible to use electro-optical devices according to some aspects of the invention as display devices of various electronic apparatuses. Examples of such electronic apparatuses include personal computers and cellular phones. Furthermore, electro-optical devices according to some aspects of the invention can also be used, for example, as a backlight provided for lighting at the back side of a liquid crystal device, or a lighting device that is mounted on an image reading device and that irradiates an original document, such as a scanner.

Furthermore, the invention provides methods of driving the electro-optical devices described above.

According to an aspect of the invention, there is provided a first method of driving an electro-optical device. The first method Is a method of driving an electro-optical device including an array of a plurality of unit circuits. The method includes sequentially selecting the plurality of unit circuits; storing correction data supplied serially through a signal line in storage circuits of the selected individual unit circuits; and controlling driving currents supplied to electro-optical elements of the individual unit circuits on the basis of intensity data specifying intensities of the electro-optical elements and the correction data stored in the storage circuits of the Unlit circuits According to another aspect of the invention, there is provided a second method of driving an electro-optical device The second method is a method of driving an electro-optical device including a plurality of unit circuits, each of the plurality of unit circuits including a correcting circuit that generates a reference current corresponding to correction data and a driving unit that drives an electro-optical element by supplying a driving current on the basis of intensity data and the reference current generated by the correcting circuit. The method includes supplying the correction data for the individual unit circuits to the signal line in a first period, while supplying the intensity data for the individual unit circuits to the signal line in a second period that is different from the first period; in the first period, sequentially inputting the correction data from the signal line to the individual unit circuits and supplying the correction data to the correcting circuits of the unit circuits; and in the second period, sequentially inputting the intensity data from the signal line to the individual unit circuits and supplying the intensity data to the driving units of the unit circuits.

According to yet another aspect of the invention, there is provided a third method of driving an electro-optical device. The third method is a method of driving an electro-optical device including a plurality of circuit portions each including a first unit circuit and a second unit circuit, each of the first unit circuits and the second unit circuits including a correcting circuit that generates a reference current corresponding to correction data, and a driving unit that drives an electro-optical element by supplying a driving current on the basis of intensity data and the reference current generated by the correcting circuit. The method includes supplying the correction data for the individual second unit circuits to a first signal line and supplying the correction data for the individual first unit circuits to a second signal line in a first period, while supplying the intensity data for the individual first unit circuits to the first signal line and supplying the intensity data for individual second unit circuits to the second signal line in a second period that is different from first period; in the first period, supplying the correction data supplied to the first signal line to the correcting circuits of the individual second unit circuits, while supplying the correction data supplied to the second signal line to the correcting circuits of the individual first unit circuits; and in the second period, supplying the intensity data supplied to the first signal line to the driving units of the individual first unit circuits, while supplying the intensity data supplied to the second signal line to the correcting circuits of the individual second unit circuits.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
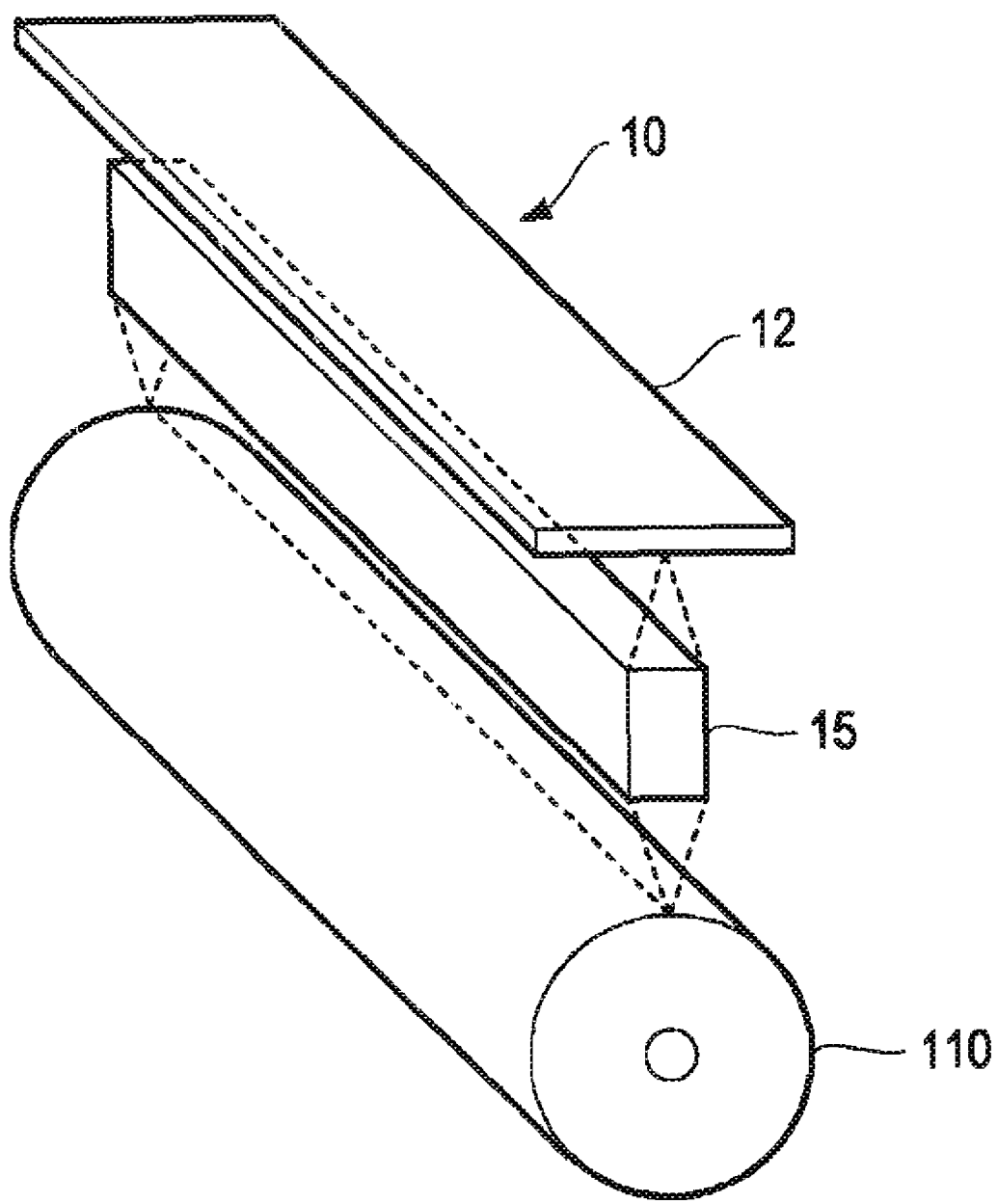
FIG. 1 is a perspective view showing a partial configuration of an image forming apparatus according to an embodiment of the invention.

FIG. 1 is a perspective view showing a partial configuration of an image forming apparatus in which an electro-optical device according to a first embodiment of the invention is used as an optical head (exposure device) As shown in FIG. 1, the image forming apparatus includes an electro-optical device 10, a condensing-lens array 15, and a photosensitive drum 110. The electro-optical device 10 includes a large number of electro-optical elements (not shown in FIG. 1) arrayed linearly on a surface of a substrate 12. The electro-optical elements selectively emit light in accordance with an image that is to be printed on a recording medium, such as a sheet of paper. The photosensitive drum 110 is supported by a rotatable shaft extending in a main scanning direction. The photosensitive drum 110 rotates in a sub-scanning direction (direction of transport of the recording medium) with an outer surface thereof opposed to the electro-optical device 10.

The condensing-lens array 15 is disposed in a space between the electro-optical device 10 and the photosensitive drum 110. The condensing-lens array 15 includes a large number of gradient-index lenses arrayed with their optical axes directed toward the electro-optical device 10. As the condensing-lens array 15, for example, SLA (SELFOC Lens Array) available from Nippon Sheet Glass Co., Ltd. (SELFOC is a registered trademark of Nippon Sheet Glass Co., Ltd.) can be used.

Lights emitted from the electro-optical elements of the electro-optical device 10 transmit through the gradient-index lenses of the condensing-lens array 15 and then reach the surface of the photosensitive drum 110. Through this exposure, an electrostatic latent image corresponding to a desired image is formed on the surface of the photosensitive drum 110. In this embodiment, it is assumed that an electrostatic image is formed by a matrix of horizontally (main scanning direction) n×vertically (sub-scanning direction) m pixels (m and n are natural numbers not less than two).

Figure 2:
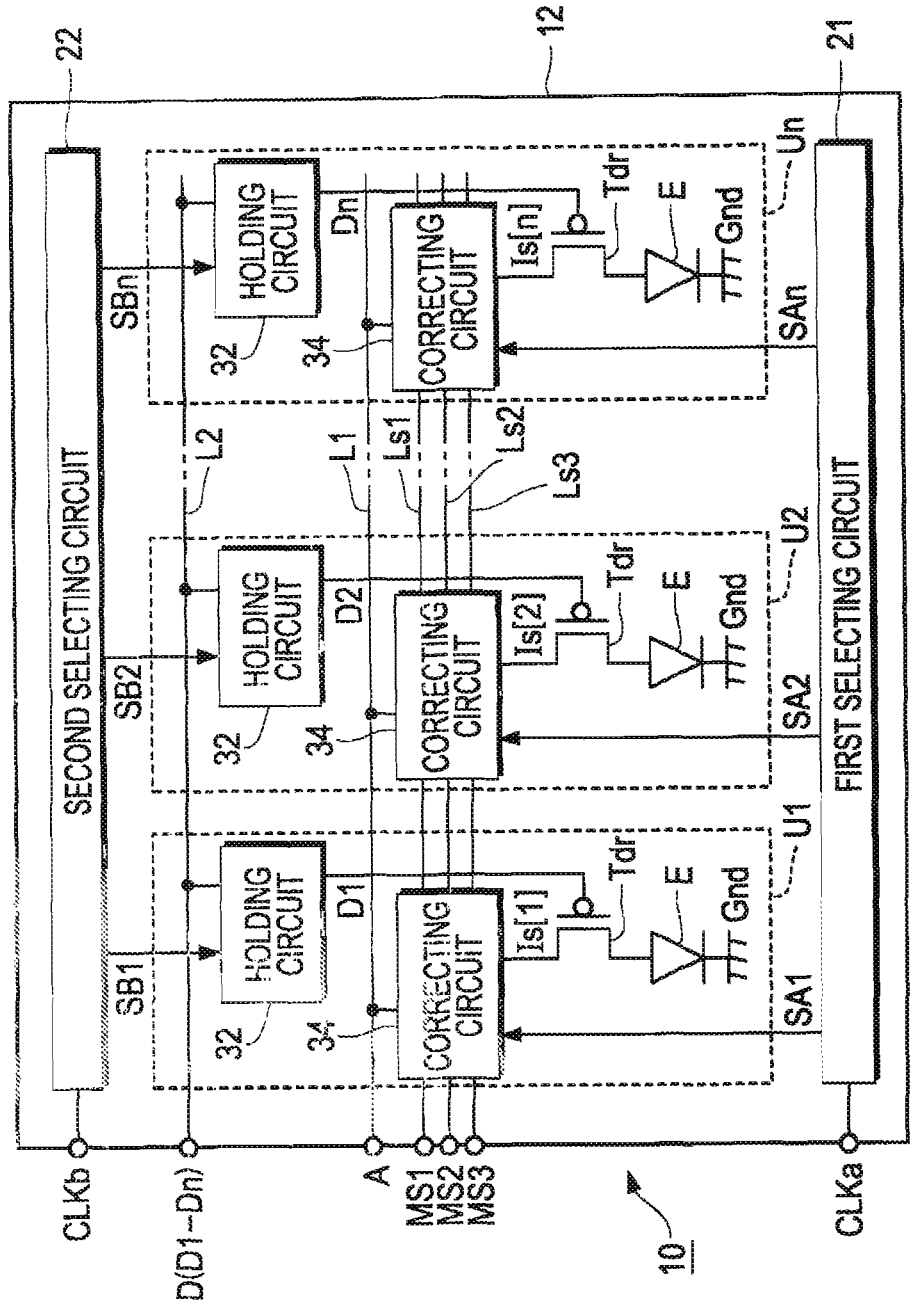
FIG. 2 is a block diagram showing the configuration of an electro-optical device according to a first embodiment.
Figure 3:
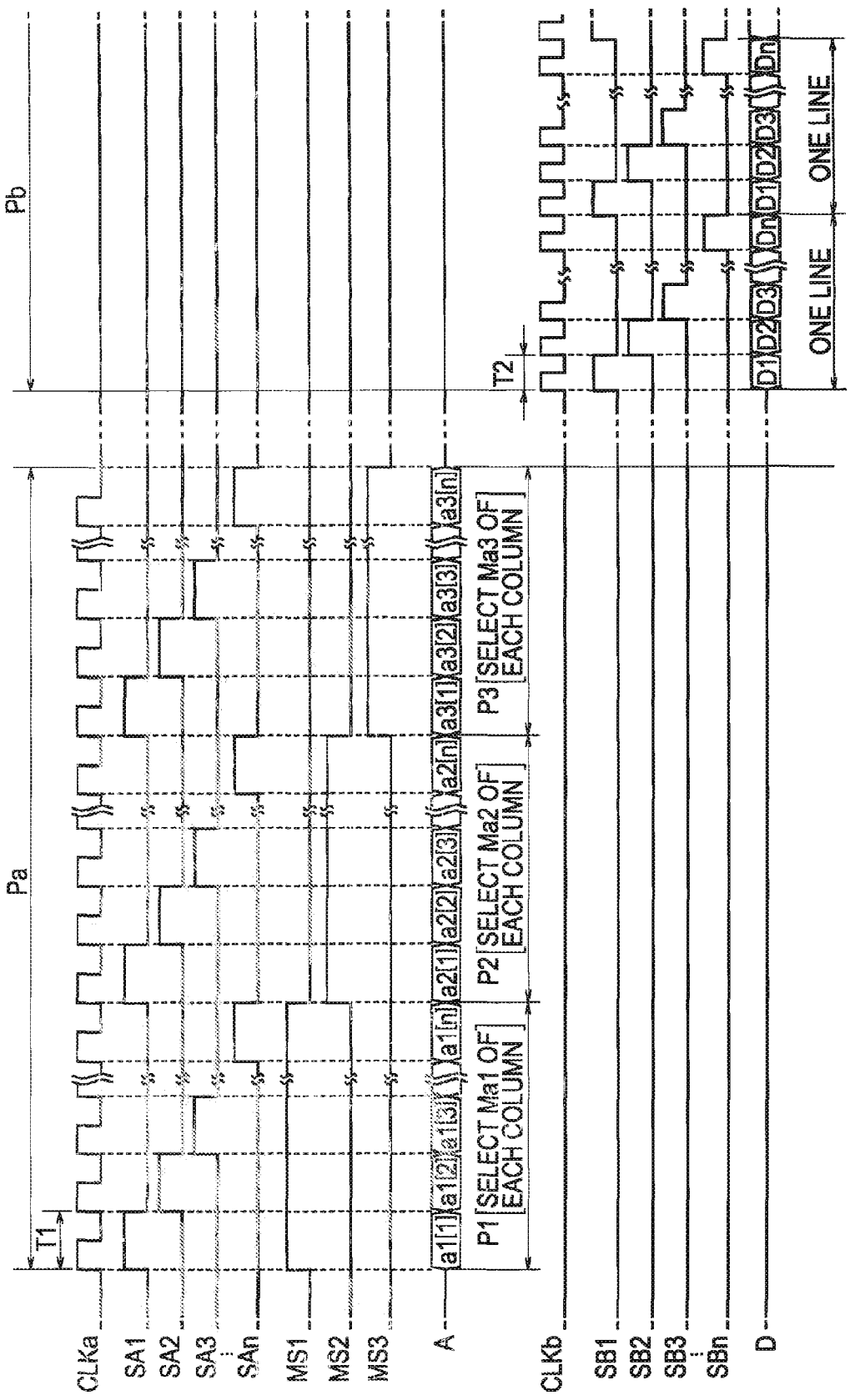
FIG. 3 is a timing chart for explaining an operation of the first embodiment.

FIG. 2 is a block diagram showing the electrical configuration of the electro-optical device 10. FIG. 3 is a timing chart showing an example of waveforms of signals used for driving the electro-optical device 10. As shown in FIG. 2, in the electro-optical device 10, a first selecting circuit 21, a second selecting circuit 22, and n unit circuits U (U1 to Un) each including an electro-optical element E are formed on the substrate 12. The unit circuits U1 to Un are arrayed in the main scanning direction. The electro-optical device 10 receives various control signals, such as clock signals (e.g., a clock signal CLKa and a clock signal CLKb), and various data (e.g., correction data A or intensity data D) from a controlling device (e.g., a CPU or a controller, hereinafter referred to as an "upper-level device") of the image forming apparatus.

Each of the first selecting circuit 21 and the second selecting circuit 22 is mounted on the substrate 12, for examples in the form of an IC chip. Alternatively, the first selecting circuit 21 and the second selecting circuit 22 may be implemented by elements (e.g., active elements, such as thin-film transistors) formed on the surface of the substrate 12 together with the elements constituting the unit circuits U1 to Un. That is, the unit circuits U1 to Un, the first selecting circuit 21, and the second selecting circuit 22 may be formed integrally on the surface of the substrate 12. In this structure, as the substrate 12, a substrate composed of an insulating material, such as glass or plastic, can be used suitably.

As shown in FIG. 3, periods of operation of the electro-optical device 10 can be classified into a first period Pa and a second period Pb. The second period Pb is a period in which the luminances of the individual electro-optical elements E are actually controlled in accordance with an image to be formed on a recording medium. That is, the second period Pb is a period in which an image corresponding to lights emitted by the electro-optical elements E is actually formed on a recording medium for output. On the other hand, the first period Pa is a period in which the control of luminances of the electro-optical elements E is stopped. For example, the first period Pa is a period for Initializing the states of the components of the electro-optical device 10 immediately after power on, or a period in which the luminances of the electro-optical elements E are not reflected on an image that is output (e.g., a period of interval between recording media in a case where an image is formed on a plurality of recording media, such as a sheet interval).

In the first period Pa, the first selecting circuit 21 shown in FIG. 2 sequentially selects the n unit circuits U1 to Un in order of array (i.e., in sequential order from the unit circuit U1 to the unit circuit Un). The first selecting circuit 21 in this embodiment is an n-bit shift register, where n corresponds to the number of the unit circuits U1 to Un. The first selecting circuit 21 outputs selection signals SA1 to SAn by sequentially shifting a predetermined pulse signal (not shown) at timings synchronized with a clock signal CLKa, as shown in FIG. 3. Thus, the selection signals SA1 to SAn sequentially change to an active level in synchronization with cycles of a period T1 of the clock signal CLKa. The transition of the selection signal SAi (i is an integer satisfying $1 \leq i \leq n$) results in the selection of the unit circuit U1. In the second period Pb, the operation of the first selecting circuit 21 is stopped (e.g., the supply of the clock signal CLKa is stopped).

Similarly to the first selecting circuit 21, the second selecting circuit 22 shown in FIG. 2 sequentially selects the n unit circuits U1 to Un. For example, the second selecting circuit 22 is an n-bit shift register. The second selecting circuit 22 outputs selection signals SB1 to SBn by sequentially shifting a predetermined pulse signal at timings synchronized with a clock signal CLKb, as shown in FIG. 3. Thus, the selection signals SB1 to SBn sequentially change to an active level in synchronization with cycles of a period T2 of the clock signal CLKb. The transition of the selection signal SBi to the active level results in the selection of the unit circuit Ui. In the first period Pa, the operation of the second selecting circuit 22 is stopped (e.g., the supply of the clock signal CLKb is stopped).

As shown in FIG. 3, the period T1 of the clock signal CLKa is longer than the period T2 of the clock signal CLKb (i.e., the operation frequency of the first selecting circuit 21 is lower than the operation frequency of the second selecting circuit 22). Thus, the period (T1) of selection of each unit circuit U by the first selecting circuit 21 is longer than the period (T2) of selection of each unit circuit U by the second selecting circuit 22.

As shown in FIG. 2, each of the unit circuits U1 to Un includes an electro-optical element E, a holding circuit 32, a correcting circuit 34, and a driving transistor Tdr. The electro-optical element E is a current-driven light-emitting element that emits an amount of light corresponding to a driving current Idr. The electro-optical element B in this embodiment is an OLED in which a light-emitting layer formed of an electroluminescence (EL) material is disposed between an anode and a cathode opposing each other. The electro-optical element E emits light at a luminance corresponding to the current value of a driving current Idr supplied to the light-emitting layer. The cathode of the electro-optical element E is connected to ground (Gnd).

The holding circuits 32 in the unit circuits U1 to Un are commonly connected to a signal line L2. To the signal line L2, intensity data D (D1 to Dn) of the individual unit circuits U are supplied serially in the second period Pb. The intensity data Di is data specifying an intensity of the electro-optical element E in the i-th unit circuit Ui. The intensity data Di in this embodiment is 1-bit digital data indicating whether the i-th electro-optical element E is to be turned on (high intensity) or turned off (low intensity). As shown in FIG. 3, the intensity data D1 to Dn are sequentially input to the electro-optical device 10 in synchronization with the clock signal CLKb. During a period in which the selection signal SBi is maintained at high level, the intensity data Di is supplied to the signal line L2. In the first period Pa, the supply of the intensity data D to the signal line L2 is stopped.

The holding circuit 32 of the unit circuit Ui obtains the intensity data Di from the signal line L2 in response to selection of the unit circuit Ui by the second selecting circuit 22. The holding circuit 32 in this embodiment is a 1-bit latch circuit. The holding circuit 32 samples the intensity data Di from the signal line T2 at a timing of transition of the selection signal Sbi to the active level and outputs the intensity data Di, and maintains the output of the intensity data Di until a next transition of the selection signal SBi to the active level.

Alternatively, two stages of holding circuits 32 may be provided. In this case, intensity data D are sequentially latched point by point by the first-stage holding circuits 32 in the individual unit circuits U, and the intensity data D (D1 to Dn) are latched sequentially line by line at predetermined timings by the second-stage holding circuits 32 in the unit circuits U. Yet alternatively, the configuration may be such than an i-th holding circuit 32 latched the intensity data Di at a timing defined by the next selection signal SBi+1 in the second selecting circuit 22.

The correcting circuit 34 of the unit circuit Ui shown in FIG. 2 generates a reference current Is[i] that serves as a reference for the driving current Idr. The configuration of the correcting circuit 34 will be described later in detail. The driving transistor Tdr generates a driving current Idr having a current value determined in accordance with the reference current Is[i] output by the correcting circuit 34 and the intensity data Di output by the holding circuit 32. That is, the driving transistor Tdr drives the electro-optical element E on the basis of the reference current Is[i] and the intensity data Di. The driving transistor Tdr in this embodiment is a p-channel transistor (typically a thin-film transistor) disposed between the correcting circuit 34 and the anode of the electro-optical element E.

The driving transistor Tdr is controlled so as to be turned on (low resistance) or turned off (high resistance) when a voltage corresponding to the intensity data Di is supplied to the gate thereof. When the driving transistor Tdr is turned on, the reference current Is[i] is supplied as the driving current Idr, whereby the electro-optical element E is turned on. On the other hand, when the driving transistor Tdr is turned off so that the path of the reference current Is is shut off, the current value of the driving current Idr becomes zero, whereby the electro-optical element E is turned off.

The characteristics of the electro-optical elements E and the driving transistors Tdr in the unit elements U might include errors attributable to manufacturing techniques. If the driving current Idr of the same value is supplied to all the electro-optical elements E even though the characteristics (e.g., the efficiency of light emission) thereof differ, variation occurs in the actual luminance (intensity) characteristics of the individual electro-optical elements E. In order to alleviate such variation in luminance characteristics, in this embodiment, the reference current Is[i] generated by the correcting circuit 34 of each unit circuit Ui is controlled so as to have a current value corresponding to correction data A generated for the unit circuit Ui.

The correction data A associated with one unit circuit Ui is 3-bit digital data composed of a highest bit a1[i], a next bit a2[i], and a lowest bit a3[i]. The correction data A is generated in advance for each electro-optical element E on the basis of results of advance measurements of the luminance of the electro-optical element E or operations by a user of the electro-optical device 10. For example, a driving current Idr of the same value is supplied to all the electro-optical elements E and actual luminances of the individual electro-optical elements E are measured, and correction data A for the individual unit circuits U1 to Un are determined on the basis of the results of the measurements (variation in luminances without correction) so that the electro-optical elements E have uniform luminance characteristics.

The correction data A for the individual unit circuits U are input from an upper-level device to a signal line L1 sequentially in the first period Pa. The bits of the correction data A are supplied serially to the signal line L1 at timings synchronized with the clock signal CLKa. Since the period T1 of the clock signal CLKa is longer than the period T2 of the clock signal CLKb, the transmission frequency of the bits of the correction data A is lower than the transmission frequency of the intensity data D. As shown in FIG. 3, in a period P1 of the first period Pa, of the correction data A for the first to n-th unit circuits U, the highest bits a1[1] to a1[n] are sequentially transmitted to the signal line L1 in that order. Furthermore, in a period P2 after the period P1, of the correction data A for the unit circuits U1 to Un, the next bits a2[1] to a2[n] are sequentially transmitted. Then, in a period P3 after the period P2, of the correction data A for the unit circuits U1 to Un, the lowest bits a3[1] to a3[n] are sequentially transmitted. In the second period Pb, the supply of the correction data A to the signal line L1 is stopped.

Figure 4:
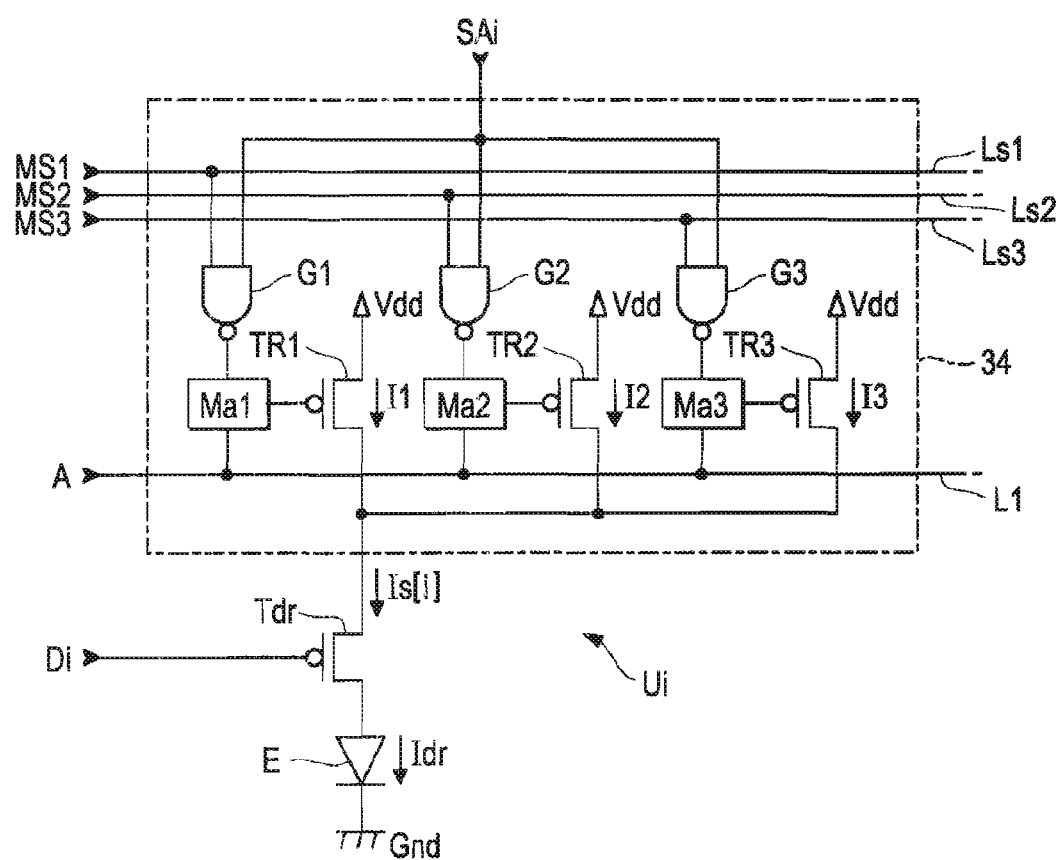
FIG. 4 is a circuit diagram showing the configuration of a unit circuit in the first embodiment.

FIG. 4 is a block diagram showing a specific configuration of the correcting circuit 34. Although only the correcting circuit 34 in the i-th unit circuit Ui is shown in FIG. 4, all the correcting circuits 34 are configured the same. As shown in FIG. 4, the correcting circuit 34 includes three memory elements Ma1 to Ma3 corresponding to the number of bits of the correction data A, three NAND gates G1 to G3 and three current-source transistors TR1 to TR3 respectively associated with the memory elements Ma1 to Ma3. An output terminal of the NAND gate Gk (k is an integer satisfying 1≦k≦3) is connected to the memory element Mak, and the gate of the current-source transistor TRk is connected to an output terminal of the memory element Mak.

As shown in FIGS. 2 and 4, three memory selecting lines Ls1 too Ls3 are connected to the unit circuits U1 to Un. The memory selecting line MSk receives a memory selection signal MSk for selecting the memory element Mak in each of the unit circuits U1 to Un. First input terminals of the NAND gates G1 in the unit circuits U1 to Un are commonly connected to the memory selecting line Ls1. Similarly, first input terminals of the NAND gates G2 are commonly connected to the memory selecting line Ls2, and first input terminals of the NAND gates G3 are commonly connected to the memory selecting line Ls3.

Furthermore, second input terminals of the NAND gates G1 to G3 in the unit circuit Ui commonly receive the selection signal SAi from the first selecting circuit 21. In this configuration, the NAND gate Gk of the unit circuit Ui calculates and outputs a negative logical product of the memory selection signal MSk and the selection signal SAi. Thus, the output of the NAND gate Gk is at low level only when both the memory selection signal MSk and the selection signal Sk are at high level, and is otherwise maintained at high level.

Each of the memory elements Ma1 to Ma3 is an element for holding a bit a of the correction data A. The memory elements Ma1 to Ma3 in all the unit circuits U1 to Un are commonly connected to the signal line L1, through which the correction data A is supplied. The memory element Mak obtains a bit a of the correction data A from the signal line L1 at a timing of transition of the output of the NAND gate Gk at a previous stage to low level (a timing at which both the memory selection signal MSk and the selection signal SAi are at high level), and stores the bit a until a next transition of the output of the NAND gate Gk to low level.

The memory selection signals MS1 to MS3 are signals for sequentially selecting the memory elements Ma1 to Ma3 in each of the unit circuits U1 to Un. The memory selection signals MS1 to MS3 sequentially change to high level in the first period Pa (maintained at low level during the second period Pb) More specifically, the memory selection signal MS1 change to high level in the period P1, in which the highest bits a1[1] to a1[n] of the correction data A for the individual unit circuits U are transmitted to the signal line L1. Similarly, the memory selection signal MS2 change to high level in the period P2, in which the next bits a2[1] to a2[n] are transmitted to the signal line L1, and the memory selection signal MS3 change to high level in the period P3, in, which the lowest bits a3[1] to a3[n] are transmitted to the signal line L1. Thus, when the selection signal SAi changes to high level (i.e., when the unit circuit Ui is selected) in the period Pk in which the memory element Mak is selected according to the memory selection signal MSk at high level, the bit ak[i] of the correction data A is obtained and stored in the memory element Mak of the unit circuit Ui. When the operation described above is executed by all the unit circuits U1 to Un in the periods P1 to P3, 3-bit correction data A is stored in each of the unit circuits Ui. The correction data A is maintained even in the second period Pb after the first period Pa.

The current-source transistors TR1 to TR3 generate reference currents IS[i] in accordance with the individual bits (a1[i], a2[i], and a3[i]) of the correction data A. Each of the current-source transistors TR1 to TR3 of the unit circuit i is a p-channel transistor having a source connected to a power supply line (power supply potential Vdd) and a drain connected to the source of the driving transistor Tdr. The gate of the current-source transistor TRk receives a voltage corresponding to the bit ak[i] stored in the memory element Mak. When the bit ak[i] stored in the memory element Mak is "1", the current-source transistor TRk is turned on, so that a current 1k flows through the current-source transistor TRk. On the other hand, when the bit ak[i] in the memory element Mak is "0", the current-source transistor TRk is turned off, so that a current Ik does not flow.

As described above, the three current-source transistors TR1 to TR3 are selectively turned on according to the correction data A. Then, the currents 1k that flow through the one or more current-source transistors TRk that have been turned on are summed to generate a reference current Is[i]. In this embodiment, the characteristics of the current-source transistors TR1 to TR3 are chosen so that the ratio of the currents I1 to I3 that flow when the respective transistors are turned on becomes I1:I2:I3=4:2:1. Thus, the reference current Is[i] is controlled so as to have one of seven values according to the correction data A for the unit circuit Ui. As described above, the current-source transistors TR1 to TR3 generate a plurality of currents I1 to I3 that are weighted by different weights.

Although the characteristics of the individual current-source transistors 64 are varied in the example described above, alternatively, each of the currents I1 to I3 can be arranged to have a current value corresponding to a desired weight by providing in parallel a number of transistors having the same characteristics, the number being determined correspondingly to the desired weight. For example, the ratio of I1:I2:I3=4:2:1 can also be achieved by providing in parallel two transistors each having the same characteristics as the current-source transistor TR3 instead of the current-source transistor TR2 and providing in parallel four transistors each having the same characteristics as the current-source transistor TR3 instead of the current-source transistor TR1.

According to the configuration described above, the current value of the driving current Idr that determines the intensity of the electro-optical element E is controlled on the basis of the reference current Is[i] corresponding to the correction data A and on the basis of the intensity data D. Thus, even when the characteristics of the individual electro-optical elements E or the characteristics of the elements (particularly the driving transistors Tdr) of the individual unit circuits U1 to Un vary, or when the power supply potentials Vdd or the ground potentials Gnd vary among the individual unit circuits U in accordance with the positions thereof due to voltage drops on the power supply line or the ground line, it is possible to alleviate variation in the luminance characteristics of the individual electro-optical elements E by choosing the correction data A appropriately.

In order to correct the intensities of the electro-optical elements E in a configuration according to the related art in which the electro-optical device 10 does not include devices for storing the correction data A, it is needed to transfer the correction data A to the electro-optical device 10 together with the intensity data D each time the intensity data D is transferred (hereinafter referred to as a "first configuration"), or to correct the intensity data D on the basis of the correction data A outside the electro-optical device 10 (hereinafter referred to as a "second configuration"). However, according to the first configuration, the amount of data that is to be transferred from an upper-level device to the electro-optical device 10 becomes huge. Particularly, in order to improve the precision of correction by reducing the step size of adjustment of the reference current Is[i], the number of bits of the correction data A must be increased. Thus, increase in the amount of data poses a serious problem. In contrast, according to this embodiment, the memory elements Ma1 to Ma3 that store the correction data A are provided in the individual unit circuits Ui. Thus, once the correction data A is stored in the memory elements Ma1 to Ma3 of each of the unit circuits Ui in the first period Pa, the correction data A need not be transferred from the upper-level device to the electro-optical device 10 any more. Therefore, according to this embodiment, compared with the first configuration, the amount of data that is to be transferred from the upper-level device to the electro-optical device 10 can be reduced.

On the other hand, in the second configuration, a circuit for correcting the intensity data D on the basis of the correction data must be provided outside the electro-optical device 10. Thus, the scale of circuitry provided in the periphery of the electro-optical device 10 increases. In contrast, according to this embodiment, the current-source transistors TR1 to TR3 for generating a reference current Is[i] in accordance with the correction data A are provided in each unit circuit Ui. Thus, in principle, a circuit for correcting the intensity data D on the basis of the correction data A is not needed. Accordingly, the scale of circuitry provided in the periphery of the electro-optical device 10 can be reduced.

Furthermore, in the first configuration, in which the correction data A is transmitted to the electro-optical device 10 in synchronization with the intensity data D, the period that can be used for transferring the correction data A is limited in accordance with the transfer rate of the intensity data D. In contrast, according to this embodiment, since the correction data A transferred to the electro-optical device 10 in the first period Pa is stored in the memory elements Ma1 to Ma3 of each unit circuit Ui, it is possible to allocate a sufficient time for transferring the correction data A to the electro-optical device 10 regardless of timing of transfer of the intensity data D. Thus, the transmission frequency of the correction data A can be reduced. For example, the transmission frequency of the correction data A may be chosen to be lower than the transmission frequency of the intensity data D, or the period of the clock signal CLKa may be chosen to be longer than the period of the clock signal CLKb so that the operation frequency of the first selecting circuit 21 becomes lower than the operation frequency of the second selecting circuit 22.

Furthermore, in the first configuration, the period that can be used for transferring the correction data A is limited. Thus, depending on the transmission frequency of the intensity data D, the correction data A supplied serially from an upper-level device must be phase-expanded into a plurality of lines (e.g., 3 lines when the correction data A has 3 bits) before the correction data A is supplied to each unit circuit U. In contrast, according to this embodiment, a sufficient time is allocated for transferring the correction data A. Thus, even when the correction data A is maintained as serial data, it is possible to obtain the correction data A reliably by each unit circuit U. That is, according to this embodiment, advantageously, it is possible to reduce the number of phases for expanding the correction data A and to thereby simplify the configuration of the electro-optical device 10.

Second Embodiment

Next, a second embodiment of the invention will be described. In the following description, elements that operate or function correspondingly to those in the first embodiment will be designated by the same signs, and detailed description thereof will be omitted as appropriate.

Figure 5:
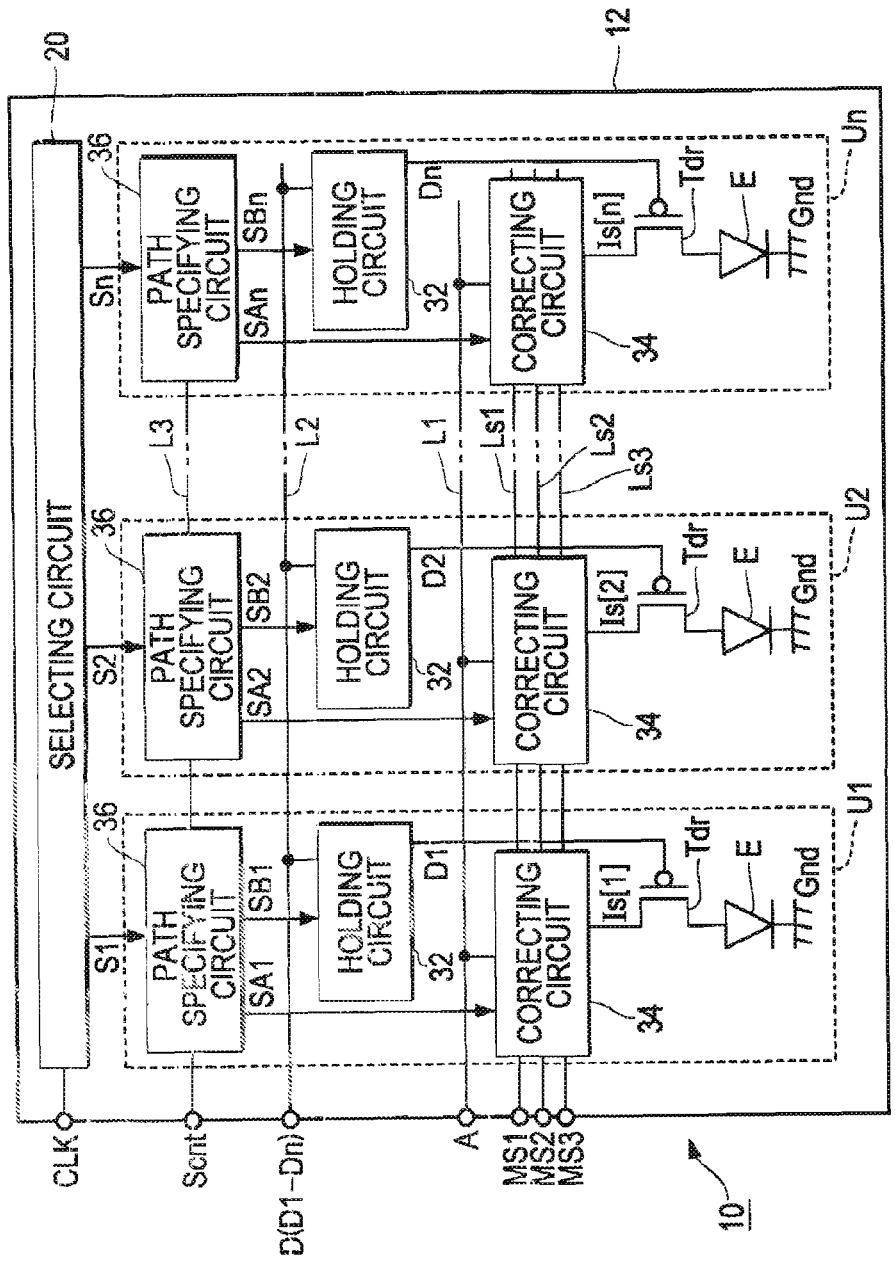
FIG. 5 is a block diagram showing the configuration of an electro-optical device according to a second embodiment.

FIG. 5 is a block diagram showing the configuration of an electro-optical device 10 according to this embodiment. The electro-optical device 10 according to the first embodiment includes two selecting circuits (the first selecting circuit 21 and the second selecting circuit 22), as shown in FIG. 2. In contrast, the electro-optical device 10 according to this embodiment includes only one selecting circuit 20 that sequentially selects the unit circuits U1 to Un, as shown in FIG. 5. Similarly to the first selecting circuit 21 and the second selecting circuit 22, the selecting circuit 20 outputs selection signals S1 to Sn by sequentially shifting a predetermined pulse signal at timings synchronized with a clock signal CLK. The selection signals S1 to Sn sequentially change to high level in synchronization with cycles of a period of the clock signal CLK.

Figure 6:
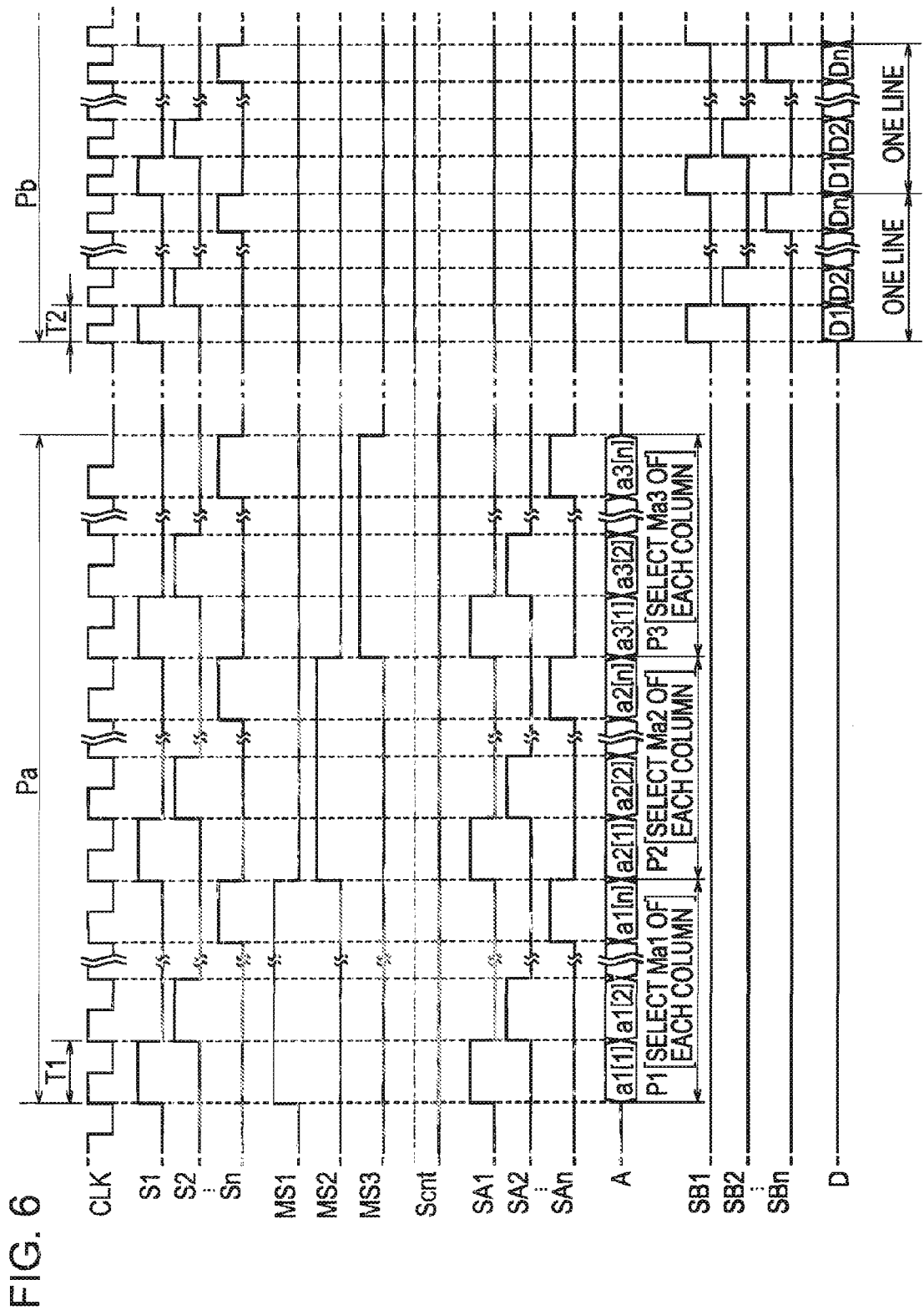
FIG. 6 is a timing chart for explaining an operation of the second embodiment.

FIG. 6 is a timing chart for explaining an operation of the electro-optical device 10. As shown in FIG. 6, the clock signal CLK is controlled to have a period T1 in the first period Pa, and is controlled to have a period T2 snorter than the period T1 in the second period Pb. Thus, the selection signals S1 to Sn sequentially change to high level in synchronization with cycles of the period T1 in the first period Pa similarly to the selection signal SAi in the first embodiment, and sequentially change to high level in synchronization with cycles of the period T2 in the second period Pb similarly to the selection signal SBi in the first embodiment.

As shown in FIG. 5, each unit circuit Ui includes a path specifying circuit 36 in addition to the elements of the unit circuit Ui in the first embodiment. The selection signal Si output from the selecting circuit 20 is supplied to the path specifying circuit 36 of the unit circuit Ui. The path specifying circuit 36 selects either the holding circuit 32 or the correcting circuit 34 when the selection signal Si changes to high level (i.e., when the unit circuit Ui is selected). As shown in FIG. 5, the path specifying circuits 36 of the unit circuits U1 to Un are commonly connected to a signal line L3. The signal line L3 receives a path specifying signal Scnt from an upper-level device. As shown in FIG. 6, the path specifying signal Scnt is maintained at low level during the first period Pas and is maintained at high level during the second period Pb.

Figure 7:
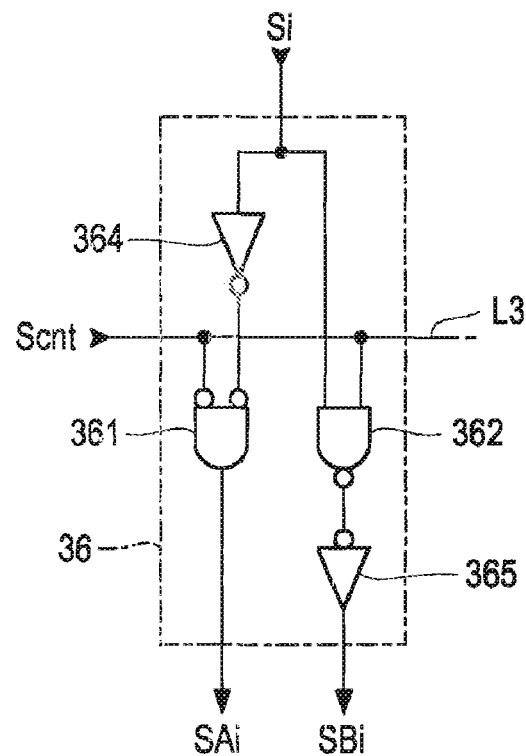
FIG. 7 is a circuit diagram, showing the configuration of a path specifying circuit in the second embodiment.

FIG. 7 is a block diagram showing a specific configuration of the path specifying circuit 36. As shown in FIG. 7, the path specifying circuit 36 includes a NOR gate 361, a NAND gate 362, and two inverters 364 and 365. The NOR gate 361 has first and second input terminals. The first input terminal receives a signal obtained by inverting the logic level of the selection signal Si by the inverter 364, and the second input terminal receives the path specifying signal Scnt. The output of the NOR gate 361 is supplied to the correcting circuit 34 as a selection signal SAi. At the NAND gate 362, the path specifying signal Scnt is input to a first input terminal, and the selection signal Si is input to a second input terminal. The inverter inverts the logic level of the output of the NAND gate 362, and outputs the inverted signal to the holding circuit 32 as a selection signal SBi.

As shown in FIG. 6, the path specifying signal Scnt is maintained at low level during the first period Pa, so that the selection signal Si output from the selecting circuit 20 is output from the NOR gate 361 of the path specifying circuit 36 to the correcting circuit 34 as a selection signal SAi. Thus, similarly to the first embodiment, the bits a of the correction data A supplied serially to the signal line L1 are sequentially obtained by the unit circuits Ui in accordance with the selection signal SAi. On the other hand, since the path specifying signal Scnt is maintained at low level, the selection signal SBi is maintained at low level regardless of the level of the selection signal Si. Thus, the holding circuit 32 does not obtain the intensity data D during the first period Pa.

During the second period Pb, since the path specifying signal Scnt is maintained at high level as shown in FIG. 6, the selection signal Si output from the selecting circuit 0 is output from the inverter of the path specifying circuit 36 to the holding circuit 32 as a selection signal SBi. Thus, similarly to the first embodiment, the intensity data D supplied serially to the signal line L2 is sequentially obtained by the unit circuits Ui in accordance with the selection signal SBi. On the other hand, during the second period Pb, since the selection signal SAi is maintained at low level, the correcting circuit 34 does not obtain the correction data A. As described above, the path specifying circuit 36 in this embodiment specifies either the correcting circuit 34 or the holding circuit 32 and outputs the selection signal Si to the specified destination.

As described above, in this embodiment, either the holding circuit 32 or the correcting circuit 34 is selected as a destination of output of the selection signals S1 to Sn. Thus, the single selecting circuit 20 suffices to sequentially select the unit circuits U1 to Un. Accordingly, compared with the first embodiment, in which two selecting circuits (the first selecting circuit 21 and the second selecting circuit 22) are provided, the configuration of the electro-optical device 10 can be simplified, and manufacturing cost can be reduced. Furthermore, compared with the configuration of the first embodiment, advantageously, the size of the electro-optical device 10 is reduced by the size of one selecting circuit.

Third Embodiment

Next, a third embodiment of the invention will be described. In the exemplary embodiments described above, the correction data A is supplied to the electro-optical device 10 in the form of digital data. In contrast, in this embodiment, the correction data A is supplied to the signal line L1 in the form of analog voltage signals. The overall configuration of the electro-optical device 10 in this embodiment is otherwise the same as that in the first embodiment (FIG. 2)

Figure 8:
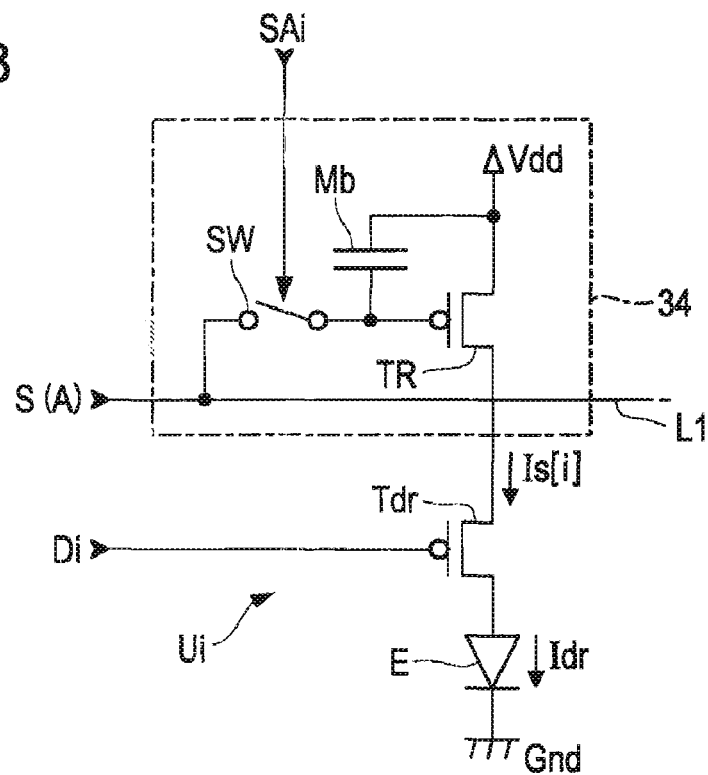
FIG. 8 is a circuit diagram showing the configuration of a unit circuit in a third embodiment.

FIG. 8 is a circuit diagram showing the configuration of a correcting circuit 34 in one unit circuit Ui. As shown in FIG. 8, in this embodiment, the correcting circuit 34 includes a current-source transistor TR, a memory element Mb, and a switching element SW. Similarly to the first embodiment, a reference current Is[i] is supplied to the source of the driving transistor Tdr, and a voltage corresponding to the intensity data Di is supplied to the gate of the driving transistor Tdr.

The current-source transistor TR is a p-channel transistor provided between the power supply line and the driving transistor Tdr. The current value of the reference current Is[i] output from the current-source transistor TR to the driving transistor Tdr is controlled according to the voltage applied to the gate of the current-source transistor TR. The memory element Mb is a capacitor provided between the gate and source (power supply line) of the current-source transistor TR. The memory element Mb holds the voltage applied to the gate of the current-source transistor TR.

The switching element SW controls the electrical connection (connected or disconnected) between the gate of the current-source transistor TR and the signal line L1 according to the selection signal SAi supplied from the first selecting circuit 21. When the selection signal SAi changes to high level, the switching element SW is turned on, whereby the gate of the current-source transistor TR is electrically connected to the signal line L1. On the other hand, when the selection signal SAi is maintained at low level, the switching element SW is turned off, whereby the gate of the current source transistor TR is electrically insulated from the signal line L1.

Figure 9:
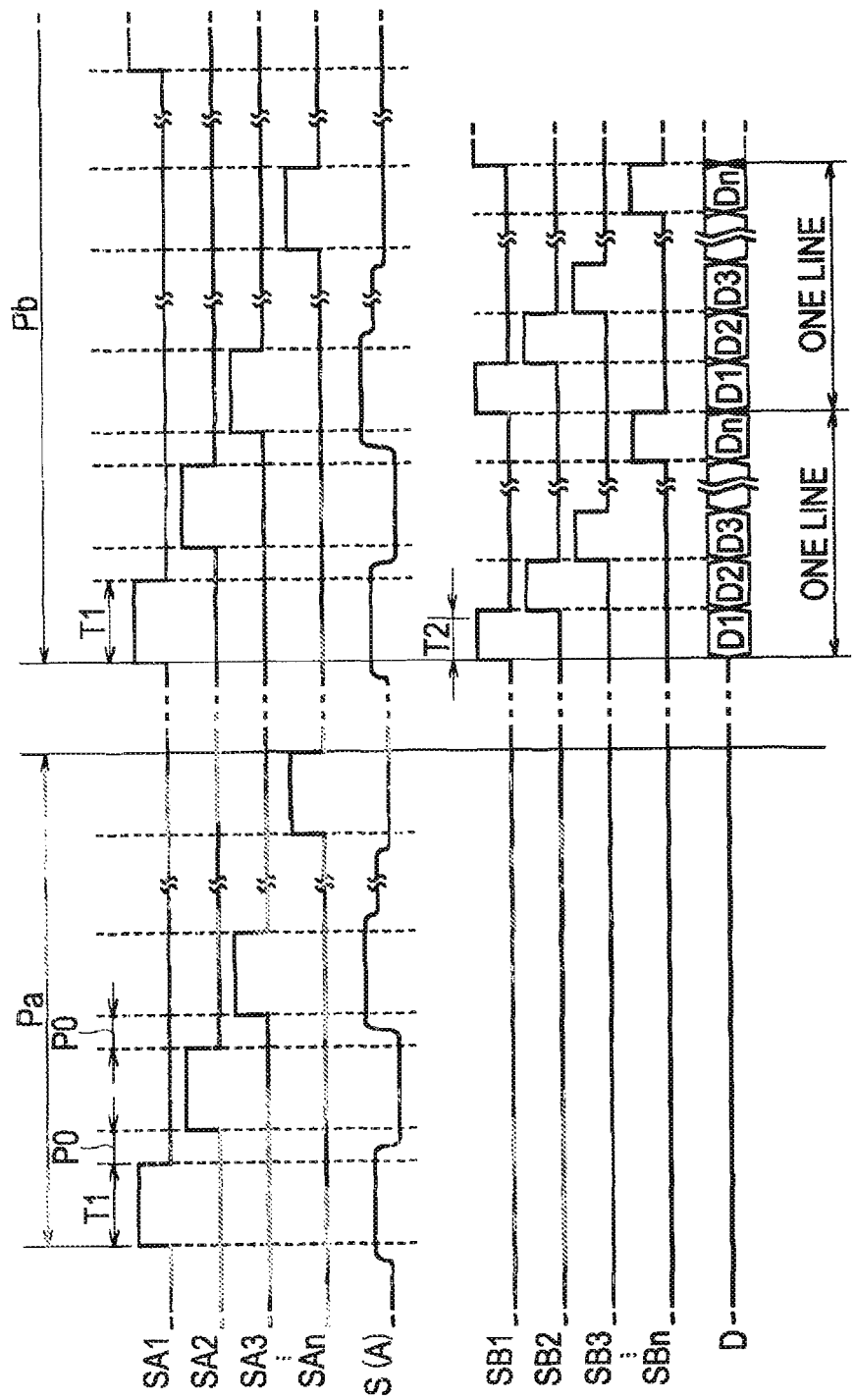
FIG. 9 is a timing chart for explaining an operation of the third embodiment.

FIG. 9 is a timing chart for explaining an operation of this embodiment. As shoots in FIG. 9, similarly to the first embodiments the first selecting circuit 21 causes the selection signals SA1 to SAn to sequentially change to high level, thereby selecting the unit circuits U1 to Un in that order. The first selecting circuit 21 in this embodiment, however, provides a predetermined interval P0 between a period in which the selection signal SAi changes to high level and a period in which the next selection signal SAi+1 changes to high level. That is, the first selecting circuit 21 selects the individual unit circuits U in periods with the intervals P0.

Correction signals S supplied to the signal line L1 are analog voltage signals that Lake on voltage values corresponding to the correction data A in periods in which the individual selection signals SA1 to SAn change to high level. More specifically, the correction signal S is maintained at a voltage value corresponding to the correction data A for the unit circuit Ui in a period (TI) in which the selection signal SAi is at active level. The voltage value of the correction signal S is chosen so that the current-source transistor TR operates in a saturated region when the voltage is applied to the gate of the current-source transistor TR.

When the selection signal SAi changes to high level in the first period Pa as shown in FIG. 9, the switching element SW of the unit circuit Ui is turned on. Thus, in the unit circuit Ui, the voltage on the signal line L1 at that time (i.e., the correction data A for the unit circuit Ui) is obtained by the correcting circuit 34 and applied to the gate of the current-source transistor TR. The voltage on the signal line L1 at this time is stored by the memory element Mb. Thus, even after the selection signal SAi changes to low level so that the switching element SW is turned off, the voltage corresponding to the correction data A is still applied to the gate of the current-source transistor TR. Since the current-source transistor TR operates in a saturated region, a reference current Is[i] corresponding to the voltage applied to the gate of the current-source transistor TR (i.e., the correction data A for the unit circuit Ui) is supplied to the source of the driving transistor Tdr. Thus, similarly to the embodiments described earlier, a driving current Idr having a current value based on the intensity data D and the correction data A (reference current Is[I]) is supplied to the electro-optical element E.

The voltage stored by the memory element Mb gradually decreases due to charge leakage or the like. In this embodiment, in order to maintain the reference current Is[i] used by the unit circuit Ui at a current value corresponding to the correction data A, an operation for applying a voltage corresponding to the correction data A again to the memory element Mb (hereinafter referred to as a "refreshing operation") is executed as needed. As shown in FIG. 9, the refreshing operation is executed as needed during the second period Pb concurrently with the obtaining of the intensity data D by the holding circuits 32. That is, the voltage of the correction signal S at the time when each of the selection signals SA1 to SAn changes to high level sequentially with the predetermined intervals P0 and the selection signal SAi changes to high level during the second period Pb is obtained by the correcting circuit 34 from the signal line L1. The voltage stored by the memory element Mb is refreshed to a voltage corresponding to the correction data A through the operation described above.

As described above, according to this embodiment, the reference current Is[i] is generated in accordance with the volt-age value of the analog correction signal S. Thus, compared with the first embodiment or the second embodiment, in which the reference current Is[i] is generated in accordance with the digital correction data A, the value of the reference current Is[i] can be controlled delicately. Accordingly, it is possible to precisely alleviate variation in the luminance characteristics of the individual electro-optical elements E. Furthermore, since the voltage stored by the memory element Mb is refreshed as needed concurrently with the obtaining of the intensity data D, the reference current Is[i] in each of the unit circuits Ui can be maintained at a desired current value.

The correction signal S gradually changes from the voltage value Vi corresponding to the correction data A for the unit circuit Ui and converges to a voltage value Vi+1 corresponding to the correction data A for the unit circuit Ui+1. Thus, for example, in a configuration where an interval P0 does not exist between a period in which the selection signal SAi is maintained at high level and a period in which the next selection signal SAi+1 is maintained at high level, it is possible that the selection signal S has not reached the voltage value Vi+1 even when the selection signal SAi+1 has changed to high level. In this case, a voltage in the middle of change from the voltage Vi to the voltage Vi+1 (i.e., a voltage that is different from the voltage Vi+1) is applied to the gate of the current-source transistor TR of the unit circuit Ui+1, so that an error (crosstalk) could occur in the current value of the reference current Is[i]. In contrast, according to this embodiment, the selection signals SA1 to SAn sequentially change to high level with intervals of P0. With this configuration, it is possible to reliably connect the gate of the current-source transistor TR to the signal line L1 only after the correction signal S changes from the voltage Vi to the voltage Vi+1 in the interval P0. Accordingly, it is possible to effectively alleviate error in the value of the reference current Is[i] due to change in the voltage of the correction signal S.

Fourth Embodiment

Figure 10:
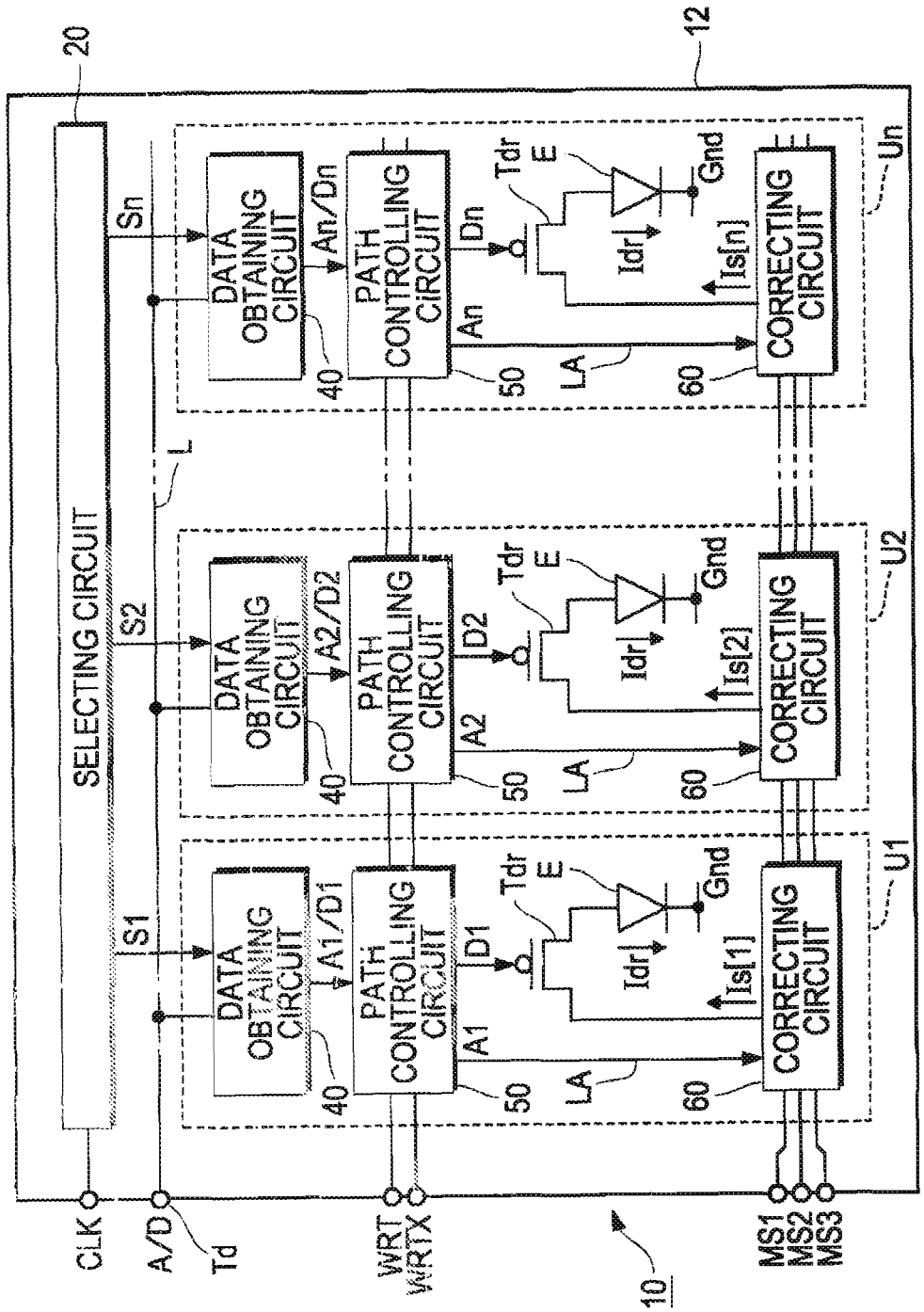
FIG. 10 is a block diagram showing the configuration of an electro-optical device according to a fourth embodiment.
Figure 11:
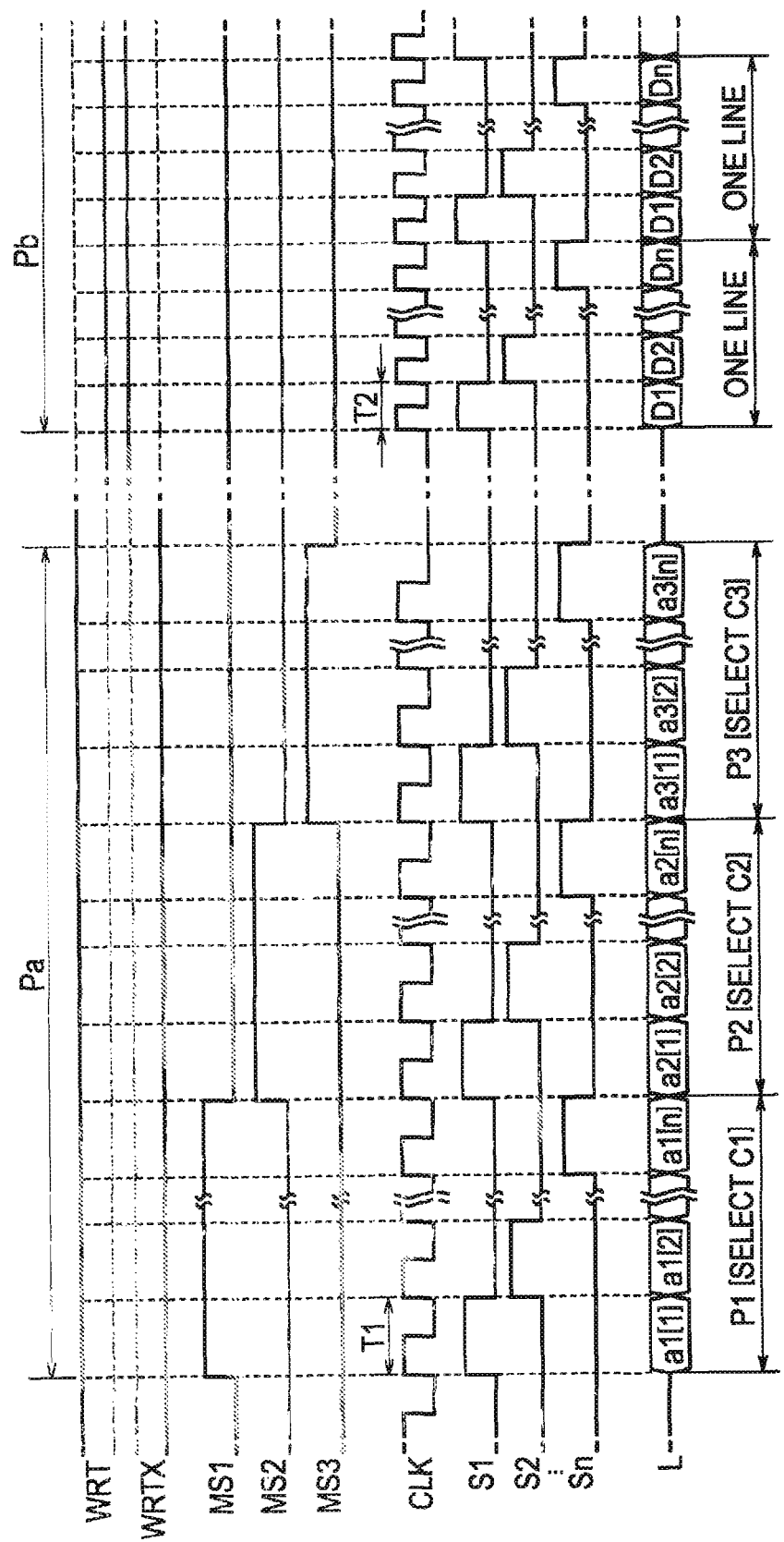
FIG. 11 is a timing chart for explaining an operation of the fourth embodiment.

FIG. 10 is a block diagram showing the electrical configuration of an electro-optical device 10 according to a fourth embodiment of the invention. FIG. 11 is a timing chart showing an example of waveforms of signals used to drive the electro-optical device 10. As shown in FIG. 10, in the electro-optical device 10, a selecting circuit 20 and n unit circuits U (U1 to Un) are provided on a surface of a substrate 12. The unit circuits U1 to Un are arrayed in a main scanning direction. Each unit circuit U includes an electro-optical element E. The electro-optical device 10 receives various signals and data from an upper-level device.

The selecting circuit 20 shown in FIG. 10 sequentially selects the n unit circuits U1 to Un in order of array (i.e., in order of the unit circuit U1 to the unit circuit Un). The selection circuit 20 in this embodiment is an n-bit shift register, where n corresponds to the number of the unit circuits U1 to Un. As shown in FIG. 11, in a first period Pa or a second period Pb, the selecting circuit 20 outputs selection signals S1 to Sn by sequentially shifting a predetermined pulse signal (not shown) in synchronization with a clock signal CLK supplied from an upper-level device. Thus, as shown in FIG. 11, the selection signals S1 to Sn sequentially change to high level in synchronization with cycles of a period of the clock signal CLK. A transition of a selection signal Si (where i is an integer satisfying $1 \leq i \leq n$) results in selection of the unit circuit Ui.

As shown in FIG. 11, the period of the clock signal CLK differs between the first period Pa and the second period Pb. More specifically, a period T1 of the clock signal CLK in the first period Pa is longer than a period T2 of the clock signal CLK in the second period Pb. Thus, a period (T1) of selection of each unit circuit U in the first period Pa is longer than a period (T2) of selection of each unit circuit U in the second period Pb.

As shown in FIG. 10, each unit circuit U includes an electro-optical element E, a driving transistor Tdr, a data obtaining circuit 40, a path controlling circuit 50, and a correcting circuit 60. The correcting circuit 60 generates a reference current Is[i] that serves as a reference for a driving current Idr. A specific configuration of the correcting circuit 60 will be described later. Similarly to the first embodiment, the reference current generated by the correcting circuit 60 of each unit circuit Ui is controlled to have a current value corresponding to correction data Ai generated for the unit circuit Ui. Correction data A1 to An are determined for the unit circuits U1 to Un so that the luminances of all the electro-optical element E exhibit uniform luminance characteristics.

The driving transistor Tdr generates a driving current Idr having a current value that is based on the reference current Is[i] output from the correcting circuit 60 and based on intensity data Di. The driving transistor Tdr in this embodiment is a p-channel transistor (typically a thin-film transistor provided between the correcting circuit 60 and the anode of the electro-optical element E.

A signal line L shown in FIG. 10 serves to transfer data input from an upper-level device to a terminal Td to the unit circuit U. The signal line L in this embodiment is used commonly for transmission of correction data A1 to An and transmission of intensity data D1 to Dn.

More specifically, in the first period Pa, as shown in FIG. 11, bits of the correction data A1 to An are sequentially supplied from an upper-level device to the signal line L via the terminal Td. The first period Pa is divided into three periods P1 to P3. In the period P1, the respective highest bits a1[1] to a1[n] of the correction data A1 to An are supplied serially to the signal line L in that order. Similarly, in the period P2, the respective next bits a2[1] to a2[n] of the correction data A1 to An are supplied to the signal line L. Furthermore, in the period P3, the respective lowest bits a3[1] to a3[n] of the correction data A1 to An are supplied to the signal line L. On the other hand, in the second period Pb, intensity data D1 to Dn are sequentially supplied to the signal line L. The correction data A1 to An and the intensity data D1 to Dn are supplied to the signal line L at timings synchronized with the clock signal CLK. Since the period T1 of the clock signal CLK in the first period Pa is longer than the period T2 of the clock signal CLK in the second period Pb, the transmission frequency (1/T1) of the bits of the correction data A1 to An is lower than the transmission frequency (1/T2) of the intensity data D1 to Dn.

Next, a specific configuration of the unit circuits U1 to Un will be described with reference to FIGS. 10 and 12. Since the configurations of all the unit circuits U1 to Un are the same, only the configuration of one unit circuit Ui will be described below, which will serve the purpose of describing the configurations of all the unit circuits U1 to Un.

The data obtaining circuit 40 of the unit circuit Ui obtains the bits a1[i] to a3[i] of the correction data Ai from the signal line L in the first period Pa, and obtains the intensity data Di from the signal line L in the second period Pb. As shown in FIG. 12, the data obtaining circuit 40 includes a transmission gate 41 and a latch circuit 45. Input terminals of the transmission gates 41 in all the unit circuits U1 to Un are commonly connected to the signal line L.

The transmission gate 41 is a switch that controls electrical connection (connected or disconnected) between the signal line L and the latch circuit 45. The transmission gate 41 is turned on during a period in which the selection signal Si is maintained at high level (i.e., a period in which a signal obtained by inverting the logic level of the selection signal Si by an Inverter 42 is maintained at low level). Thus, the data obtaining circuit 40 of the unit circuit Ui obtains data that is being supplied to the signal line L during the period in which the selection signal Si is maintained at high level (i.e., the bits a1[i] to a3[i] of the correction data Ai in the first period Pa or the intensity data Di in the second period Pb) via the transmission gate 41.

The latch circuit 45 includes a clocked inverter 451 and an inverter 452. An output terminal of the clocked inverter 451 is connected to an output terminal of the transmission gate 41 and an input terminal of the inverter 452. An output terminal of the inverter 452 is connected to an input terminal of the clocked inverter 451 and the path controlling circuit 50. During the period in which the selection signal Si is maintained at high level, the clocked inverter 451 is in a high-impedance state. On the other hand, when the selection signal Si is shifted to low level, the clocked inverter 451 functions as an inverter. Thus, during the period in which the selection signal Si is maintained at low level, data obtained by the transmission gate 41 immediately before is held by the latch circuit 45 and output to the path controlling circuit 50. More specifically, in the first period Pa, the bits a1[i] to a3[i] of the correction data Ai are sequentially latched at timings of transitions of the selection signal Si to low level. On the other hand, in the second period Pb, the intensity data Di is sequentially latched at timings of transitions of the selection signal Si to low level.

The path controlling circuit 50 changes the output destination of the data obtained by the data obtaining circuit 40 from the signal line L according to a path controlling signal WRT and an inverted path controlling signal WRTX. As shown in FIG. 11, the path controlling signal WRT is maintained at high level during the first period Pa and is maintained at low level in the second period Pb. The inverted path controlling signal WRTX is a signal having a logic level opposite to the logic level of the path controlling signal WRT.

Figure 12:
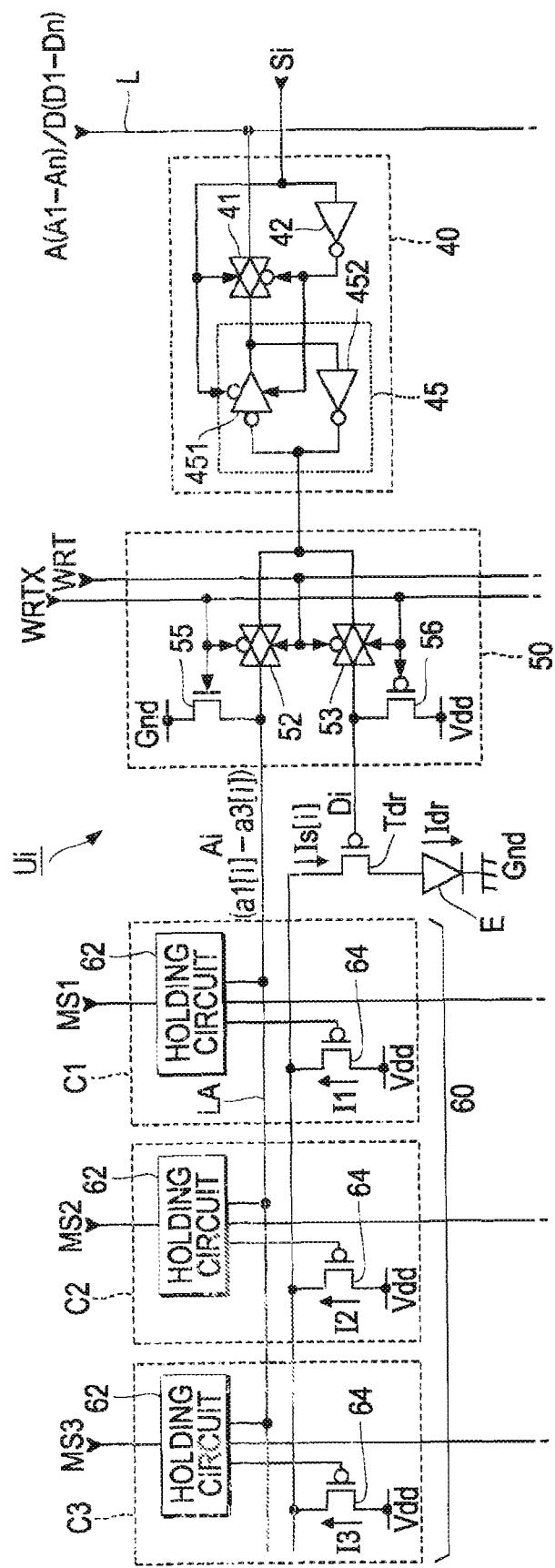
FIG. 12 is a circuit diagram showing the configuration of a unit circuit in the fourth embodiment.

As shown in FIG. 12, the path controlling circuit 50 includes two transmission gates 52 and 53, an n-channel transistor 55, and a p-channel transistor 56. The transmission gate 52 is a switch that controls electrical connection between the data obtaining circuit 40 and the correcting circuit 60 (correction-data line LA). The transmission gate 53 is a switch that controls electrical connection between the data obtaining circuit 40 and the driving transistor Tdr. The transmission gate 52 and the transmission gate 53 are alternatively turned on according to the path controlling signal WRT and the inverted path controlling signal WRTX. More specifically, the transmission gate 52 is kept turned on and the transmission gate 53 is kept turned off during the first period Pa, in which the path controlling signal WRT is maintained at high level. On the other hand, the transmission gate 52 is kept turned off and the transmission gate 53 is kept turned on during the second period Pb, in which the path controlling signal WRT is maintained at low level.

The transistor 55 is a switch that controls electrical connection between the ground Gnd and the correction-data line LA. The transistor 55 is turned on during the second period Pb, in which the inverted path controlling signal WRTX is maintained at high level. The transistor 56 is a switch that controls electrical connection between the power supply Vdd and the driving transistor Tdr. The transistor 56 is turned on during the first period Pa, in which the inverted path controlling signal WRTX is maintained at low level.

With the configuration described above, in the first period Pa, the bits a1[i] to a3[i] of the correction data Ai output from the data obtaining circuit 40 are sequentially supplied to the correction-data line LA via the transmission gate 52, and the power supply voltage Vdd is supplied to the gate of the driving transistor Tdr via the transistor 56, so that the driving transistor Tdr is turned off. Thus, in the first period Pa, all the electro-optical elements E are turned off. On the other hand, in the second period Pb, the transistor 55 is turned on, so that the potential of the correction-data line LA is maintained at the ground potential Gnd. Furthermore, a voltage corresponding to the intensity data Di output from the data obtaining circuit 40 is supplied to the gate of the driving transistor Tdr via the transmission gate 53. Thus, in the second period Pb, the intensities of the individual electro-optical elements E are controlled according to the intensity data Di.

As shown in FIG. 12, the correcting circuit 60 includes three current generators C (C1 to C3) corresponding to the number of bits of the correction data Ai, and one correction-data line LA. The current generators C1 to C3 are commonly connected to the path controlling circuit 50 (more specifically, an output terminal of the transmission gate 52) via the correction-data line LA. The k-th (k is an integer satisfying $1 \leq k \leq 3$) current generator Ck includes a holding circuit 62 that obtains the bit ak[i] of the correction data Ai from the correction-data line LA and holds the bit ak[i], and a current-source transistor 64 that generates a current Ik corresponding to the bit ak[i] held by the holding circuit 62. The current-source transistors 64 of the current generators C1 to C3 are p-channel transistors with the sources thereof connected to the power supply Vdd and the drains thereof connected to the source of the driving transistor Tdr.

Figure 13:
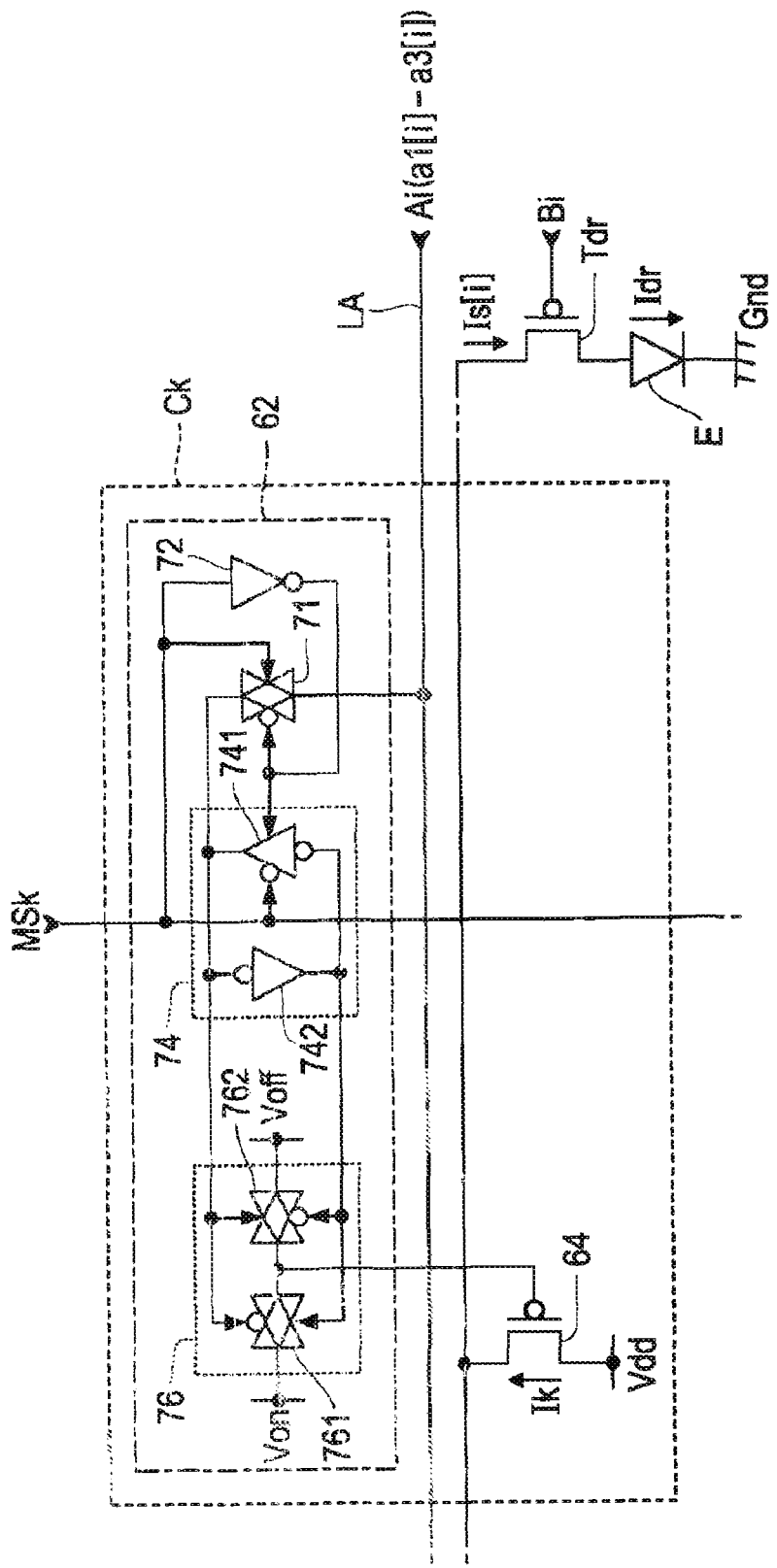
FIG. 13 is a circuit diagram showing the configuration of a current generator in the fourth embodiment.

FIG. 13 is a block diagram showing the configuration of the current generators Ck (C1 to C3). As shown in FIG. 13, the holding circuit 62 of the current generator Ck includes a transmission gate 71, an inverter 72, a latch circuit 74, and a switch 76. Input terminals of the transmission gates 71 of the three current generators C1 to C3 are commonly connected to the correction-data line LA. Furthermore, the transmission gates 71 and the latch circuits 74 of the current generators Ck in the unit circuits U1 to Un commonly receive a write signal MSk. Write signals MS1 to MS3 are signals for selecting one of the three current generators C1 to C3 in each of the unit circuits U1 to Un.

As shown in FIG. 11, the write signals MS1 to MS3 sequentially change to high level in the first period Pa. More specifically, the write signal MS1 changes to high level in the period P1, in which the respective highest bits a1[1] to a1[n] of the correction data A1 to An are supplied to the signal line L. Similarly, the write signal MS2 changes to high level in the period P2, in which the respective next bits a2[1] to a2[n] are supplied to the signal line L, and the write signal MS3 changes to high level in the period P3. On the other hand, in the second period Pb, the write signals MS1 to MS3 are maintained at low level.

The transmission gate 71 shown in FIG. 13 is a switch that controls electrical connection between the correction-data line LA and the latch circuit 74. The transmission gate 71 is turned on during a period Pk in which the write signal MSk is maintained at high level (i.e., a signal obtained by inverting the logic level of the write signal MSk by the inverter 72 is maintained at low level). The latch circuit 74 includes a clocked inverter 741 and an Inverter 742, similarly to the latch circuit 45 of the data obtaining circuit 40. During a period in which the write signal MSk is maintained at low level, the clocked inverter 741 functions as an inverter, so that the latch circuit 74 holds an output (bit ak[i]) of the transmission gate 71 immediately before transition of the write signal MSk to low level.

The bit ak[i] of the correction data Ai, obtained as described above by the data obtaining circuit 40 from the signal line L according to the selection signal Si, is input to the current generator Ck from the correction-data line LA via the transmission gate 71 when the transmission gate 71 is turned on according to the write signal MSk at high level, and is held by the latch circuit 74 from the timing of transmission of the write signal MSk to low level (i.e., the end of the period Pk). When this operation has been executed by all the unit circuits U1 to Un in each of the periods P1 to P3, 3-bit correction data A4 is held in each unit circuit Ui. The correction data Ai is maintained further in the second period Pb after the first period Pa.

The switch 76 exercises control to turn on or turn off the current-source transistor 64 according to the bit ak[i] held in the latch circuit 74. The switch 76 includes a transmission gate 761 and a transmission gate 762. When the bit ak[i] is "1", the transmission gate 761 is turned on and the transmission gate 762 is turned off. Thus, an ON voltage Von is supplied to the gate of the current-source transistor 64 via the transmission gate 761, so that the current-source transistor 64 is turned on. Accordingly, a current Ik flows through the current-source transistor 64. On the other hand, when the bit ak[i] is "0", the transmission gate 761 is turned off and the transmission gate 762 is turned on. Thus, the potential at the gate of the current-source transistor 64 becomes an off potential Voff. Accordingly, the current-source transistor 64 is turned off, whereby a current Ik does not flow.

As described above, the three current-source transistors 64 are selectively turned on according to the bits of the correction data A. Then, a reference current Is[i] is generated by summing the currents Ik that flow through the one or more current-source transistors 64 that have been turned on. The characteristics of the three current-source transistors 64 included in each unit circuit U are chosen so that the ratio of the current values of the currents I1 to I3 that flow when the respective current-source transistors 64 are turned on becomes I1:I2:I3=4:2:1. Thus, the reference current Is[i] has one of seven current values according to the correction data A for the unit circuit Ui. That is, the correcting circuit 60 functions as a digital to analog converter (DAC) that generates a reference current Is[i] having a current value corresponding to the correction data Ai.

Although the characteristics of the individual current-source transistors 64 are varied in the example described above, alternatively, each of the currents I1 to I3 to can be arranged to have a current value corresponding to a desired weight by providing in parallel a number of transistors having the same characteristics, the number being determined correspondingly to the desired weight. For example, the ratio of I1:I2:I3=4:2:1 can also be achieved by providing in parallel two transistors each having the same characteristics as the current-source transistor 64 in the current generator C3 instead of the current-source transistor 64 in the current generator C2 and providing in parallel four transistors each having the same characteristics as the current-source transistor 64 in the current generator C3 instead of the current-source Transistor 64 in the current generator C1.

With the configuration described above, the current value of the driving current Idr, which determines the intensity of the electro-optical element E of the unit circuit Ui, is controlled based on the reference current Is[i] corresponding to the correction data Ai and based on the intensity data Di. Thus, even when variation exists in the characteristics of the electro-optical elements E or the elements (particularly the driving transistors Tdr) of the unit circuits U1 to Un, it is possible to suppress variation in the intensity characteristics of the electro-optical elements E by appropriately choosing the correction data A1 to An. Furthermore, since the correcting circuit 60 that generates the reference current Is[i] corresponding to the correction data Ai is provided in each unit circuit U, in principle, a circuit for correcting the intensity data on the basis of the correction data Ai is not needed. Therefore, according to this embodiment, the scale of peripheral circuits of the electro-optical device 10 can be reduced.

Furthermore, in this embodiment, one signal line L is used commonly for transmission of the correction data A1 to An and the intensity data D1 to Dn. This is advantageous in various respects compared with a configuration where a line for transmission of the correction data A1 to An and a line for transmission of the intensity data D1 to Dn are provided separately. For example, since the correction data A1 to An and the intensity data D1 to Dn needed not be distinguished in processing for outputting data from an upper-level device to the electro-optical device 10, the processing load of the upper-level device is reduced. Furthermore, since the correction data A1 to An and the intensity data D1 to Dn are input to the common terminal Td, compared with a configuration where the correction data A1 to An and the intensity data D1 to Dn are input to separate terminals, the number of terminals is reduced. Thus, the possibility of defects of connection of the terminals with the outside is reduced. This serves to improve the reliability of the electro-optical device 10. In an image forming apparatus, vibration of the electro-optical device 10 occurs when a recording material is transported or when the photosensitive drum 110 is driven, so that portions for connecting the electro-optical device 10 with the outside are susceptible to damage. Therefore, the configuration of this embodiment, in which the number of terminals is reduced, is particularly suitable when the electro-optical device 10 is used in an image forming apparatus.

The correction circuit 60, to which the correction data Ai is output, has a greater circuit scale than the driving transistor Tdr, to which the intensity data Di is output. Furthermore, the length of the correction-data line LA, through which the correction data Ai is transmitted, is longer than the path of transmission of the intensity data Di. Thus, if the correction data Ai is input to the unit circuit Ui and supplied to the correcting circuit 60 at substantially the same rate as the intensity data Di, the latch circuits 74 of the correcting circuit 60 could fail to store the bits of the correction data Ai. According to this embodiment, the period T1 of output of the correction data A1 to An from the path controlling circuit 50 to the correcting circuit 60 is longer than the period T2 of output of the intensity data D1 to Dn, so that a sufficient time is available for the correcting circuit 60 to obtain the bits a1[i] to a3[i]. Accordingly, the correction data A1 to An can be stored in the correction circuit 60 accurately and reliably.

Fifth Embodiment

Figure 14:
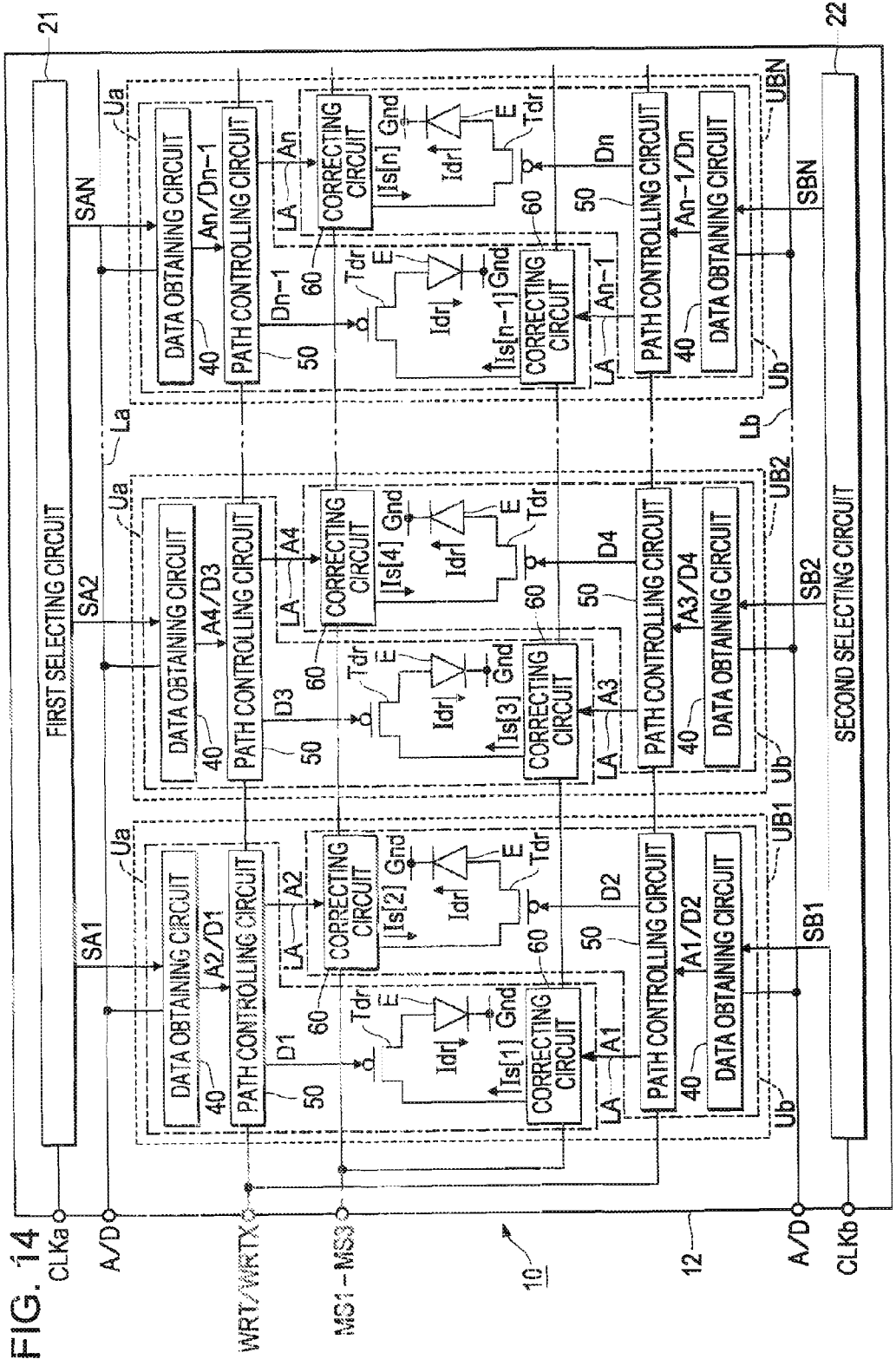
FIG. 14 is a block diagram showing the configuration of an electro-optical device according to a fifth embodiment.
Figure 15:
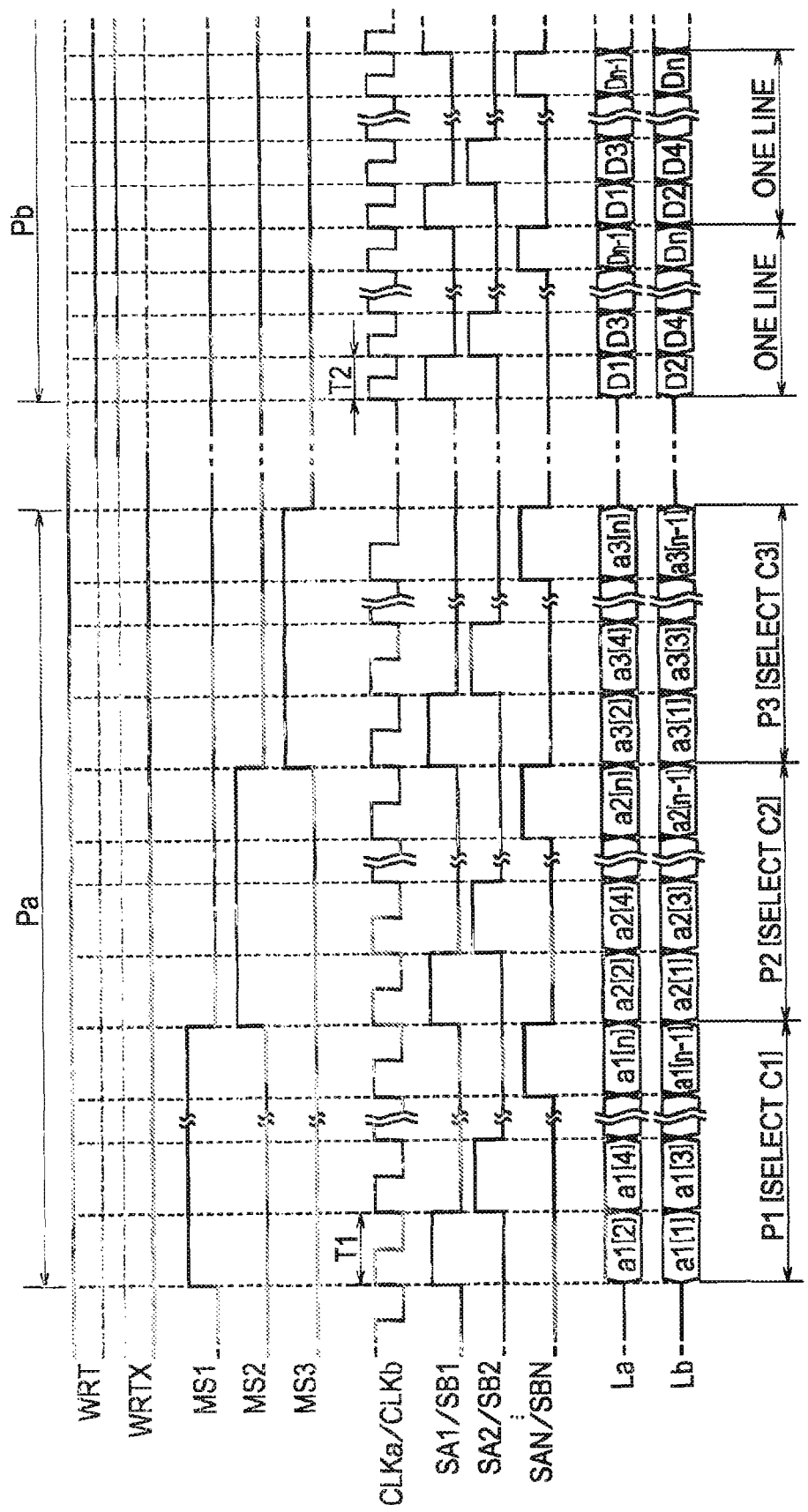
FIG. 15 is a timing chart for explaining an operation of the fifth embodiment.

FIG. 14 is a block diagram showing the configuration of the electro-optical device 10 according to a fifth embodiment of the invention. FIG. 15 is a timing chart showing waveforms of signals at elements of the electro-optical device 10. As shown in FIG. 14, the electro-optical device 10 includes n unit circuits U arrayed along a main scanning direction, a first selecting circuit 21 and a second selecting circuit 22 provided on either side of he unit circuits U, and a first signal line La and a second signal line Lb. Hereinafter, a pair of an odd-numbered unit circuit U (hereinafter referred to as a "first unit circuit Ua") as counted from the left side in FIG. 14 and an even-numbered unit circuit U (hereinafter referred to as a "second unit circuit Ub") adjacent on the right side will be referred to as a "circuit portion UB (UB1 to UBN)" (N=n/2)

The first selecting circuit 21 sequentially selects the first unit circuits Ua in each of the first period Pa and the second period Pb. As shore in FIG. 15, the first selecting circuit 21 in this embodiment sequentially sets selection signals SA1 to SAN output to the first unit circuits Ua to high level in synchronization with cycles of a period of a clock signal CLKa. Similarly, the second selecting circuit 22 sequentially sets selection signals SB1 to SEN output to the second unit circuits Ub to high level in synchronization with cycles of a period of a clock signal CLKb, thereby sequentially selecting the second unit circuits Ub in each of the first period Pa and the second period Pb. The clock signal CLKa and the clock signal CLKb nave the same waveform. Thus, as shown in FIG. 15, the selection signal SAj (j is an integer satisfying 1≦j≦N) and the selection signal SBj have the same waveform. That is, at a timing when the first selecting circuit 21 selects the first unit circuit Ua of a circuit portion UBj, the second selecting circuit 22 selects the second unit circuit Ub of the same circuit portion UBj. Furthermore, similarly to the fourth embodiments the period T1 of the clock signal CLKa and the clock signal CLKb in the first period Pa is longer than the period T2 thereof in the second period Pb. Although FIG. 14 shows an example where the clock signal CLKa and the clock signal CLKb are input to separate terminals, a clock signal (e.g., a clock signal CLKa shown in FIG. 15) input to one terminal may be supplied to both the first selecting circuit 21 and the second selecting circuit 22.

As shown in FIG. 15, to the first signal line La, correction data A for the second unit circuits Ub and intensity data D for the first unit circuits Ua are supplied serially. More specifically, in the first period Pa, the bits of the correction data a (A2, A4, ..., An) for the second unit circuits Ub are supplied to the first signal line La in synchronization with cycles of the period T1 of the clock signal CLKa. In the second period Pb, the intensity data D (D1, D3, ..., Dn-1) for the first unit circuits Ua are supplied to the first signal line La in synchronization with cycles of the period T2 of the clock signal CLKa. Furthermore, to the second signal line Lb, correction data A for the first unit circuits Ua and intensity data D for the second unit circuits Ub are supplied serially. More specifically, the bits of the correction data A (A1, A3, ..., An-1) for the first unit circuits Ua are supplied to the second signal line Lb in synchronization with cycles of the period T1 in the first period Pa, and the intensity data D (D2, D4, ..., Dn) for the second unit circuits Ub are supplied to the second signal line Lb in synchronization with cycles of the period T2 in the second period Pb.

Each of the unit circuits U (the first unit circuits Ua and the second unit circuits Ub) includes an electro-optical element E, a driving transistor Tdr, a data obtaining circuit 40, a path controlling circuit 50, and a correcting circuit 60. The specific configuration of these individual components are the same as those in the fourth embodiment. However, the data obtaining circuit 40 and the path controlling circuit 50 of each of the first unit circuits Ua and the correcting circuit 60 of each of the second unit circuits Ub are located on the side of the first selecting circuit 21 with respect to the array of n electro-optical elements E while the data obtaining circuit 40 and the path controlling circuit 50 of each of the second unit circuits Ub and the correcting circuit 60 of each of the first unit circuits Ua are located on the side of the second selecting circuit 22 with respect to the array of n electro-optical elements E. Thus, the path controlling circuit 50 of the first unit circuit Ua in a circuit portion UBj is located opposite to the electro-optical element E of the second unit circuit Ub in the same circuit portion UBj with respect to the correcting circuit 60 of the second unit circuit Ub. Furthermore, the path controlling circuit 50 of the second unit circuit Ub in the circuit portion UBj is located opposite to the electro-optical element E of the first unit circuit Ua in the same circuit portion UBj with respect to the correcting circuit 60 of the first unit circuit Ua.

The data obtaining circuits 40 of the first unit circuits Ua in the circuit portions UBj sequentially obtain data from the first signal line La according to the selection signals SAj supplied from the first selecting circuit 21. More specifically, the data obtaining circuits 40 of the first unit circuits Ua in the circuit portions UB1 to UBN sequentially obtain the bits (a1[2], a1[4], ..., a1[n], a2[2], a2[4], ..., a2[n], a3[2], a3[4], ..., a3[n]) of the correction data A for the second unit circuits Ub in the first period Pa in synchronization with cycles of the period T1, and sequentially obtain the intensity data D (D1, D3, ..., Dn-1) for the first unit circuits Ua in the second period Pb in synchronization with cycles of the period T2.

On the other hand, the data obtaining circuits 40 of the second unit circuits Ub in the circuit portions UBj sequentially obtain data from the second signal line Lb according to the selection signals SBj supplied from the second selecting circuit 22. More specifically, the data obtaining circuits 40 of the second unit circuits Ub in the circuit portions UB1 to UBN sequentially obtain the bits (a1[1], a1[1], . . . , a1[n-1], a2[1], a2[3], . . . , a2[n-1], a3[1], a3[3], . . . , a3[n-1]) of the correction data A for the first unit circuits Ua in the first period Pa, and sequentially obtain the intensity data D (D2, D4, . . . , Dn) for the second unit circuits Ub in the second period Pb.

Furthermore, the path controlling circuit 50 of the first unit circuit Ua in the circuit portion UBj switches the destination of output of data obtained by the data obtaining circuit 40 at the previous stage between the driving transistor Tdr of the first unit circuit Ua and the correcting circuit 60 of the second unit circuit Ub in the circuit portion UBj. More specifically, the path controlling circuit 50 of the first unit circuit Ua sequentially outputs the bits of the correction data (A2, A4, . . . , An) supplied in the first period Pa to the correcting circuit 60 of the second unit circuit Ub in the circuit portion UBj, and supplies voltages corresponding to the intensity data (D1, D3, . . . , Dn-1) supplied in the second period Pb to the gate of the driving transistor Tdr of the first unit circuit Ua.

Similarly, the path controlling circuit 50 of the second unit circuit Ub in the circuit portion UBj switches the destination of output of data supplied from the data obtaining circuit 40 between the driving transistor Tdr of the second unit circuit tin and the correcting circuit 60 of the first unit circuit Ua in the circuit portion UBj. More specifically, the path controlling circuit 50 of the second unit circuit Ub sequentially outputs the bits of the correction data (A1, A3, . . . , An-1) supplied in the first period Pa to the correcting circuit 60 of the first unit circuit Ua in the circuit portion UBj, and supplies voltages corresponding to the intensity data (D2, D4, . . . , Dn) supplied in the second period Pb to the gate of the driving transistor Tdr of the second unit circuit Ub. Also in this configuration, the correcting circuit 60 and the driving transistor Tdr of each of the unit circuits U operate in the same manners as in the fourth embodiment. According to this embodiment, the same advantages as in the fourth embodiment can be achieved.

In the electro-optical device 10 according to the fourth embodiment, as shown in FIG. 10, the electro-optical device E is disposed between the correcting circuit 60 and the path controlling circuit 50 of each unit circuit U. Thus, the correction-data line LA must be formed so as to cross the electro-optical elements E arrayed along the main scanning direction. In contrast, according to this embodiment, the electro-optical element E or the driving transistor Tdr does not exist in the space between the correcting circuit 60 of the first unit circuit Ua in a circuit portion UBj and the path controlling circuit 50 of the second unit circuit Ub in the circuit portion UBj. This is also the case with the space between the correcting circuit 60 of the second unit circuit Ub and the path controlling circuit 50 of the first unit circuit Ua. Thus, the correction-data line LA need not be formed so as to cross the array of the electro-optical elements E. Since lines provided in the periphery of the electro-optical elements E are reduced as described above, according to this embodiment, the area of each electro-optical element E can be increased compared with the fourth embodiment. This indicates that the electric energy (current value or current density) that is to be supplied to the electro-optical element E in order to achieve a predetermined intensity of light emission can be reduced. By reducing the electric energy supplied to the electro-optical element E, advantageously, power consumption can be reduced, and the lifetime of the electro-optical element E can be increased.

Furthermore, according to this embodiment, the supply of data to the first unit circuits Ua and the supply of data to the second unit circuits Ub are carried out concurrently. Thus, advantageously, the time needed to supply the correction data A and the intensity data D to all the unit circuits U is reduced to about half compared with the fourth embodiment. As opposed to the fourth embodiment, in which the unit circuits U are selected by the one selecting circuit 20, in this embodiment, two selecting circuits (the first selecting circuit 21 and the second selecting circuit 22) are needed. However, the scale of each of the first selecting circuit 21 and the second selecting circuit 22 is about half the scale of the selecting circuit 20 in the fourth embodiment (e.g., an n/2-bit shift register suffices). Therefore, considering the electro-optical device 10 as a whole, the scale of circuitry involved in selection of the unit circuits U does not substantially increased compared with the fourth embodiment.

Sixth Embodiment

Next, a sixth embodiment of the invention will be described.

In the fourth exemplary embodiment, the selecting circuit 20 selects each of the n unit circuits U. However, the method and configuration for selecting unit circuits U to which data is to be supplied may be designed arbitrarily. In this embodiment, the selecting circuit 20 is not provided on the substrate 12, and the unit circuits U are sequentially selected according to signals supplied from an upper-level device.

Figure 16:
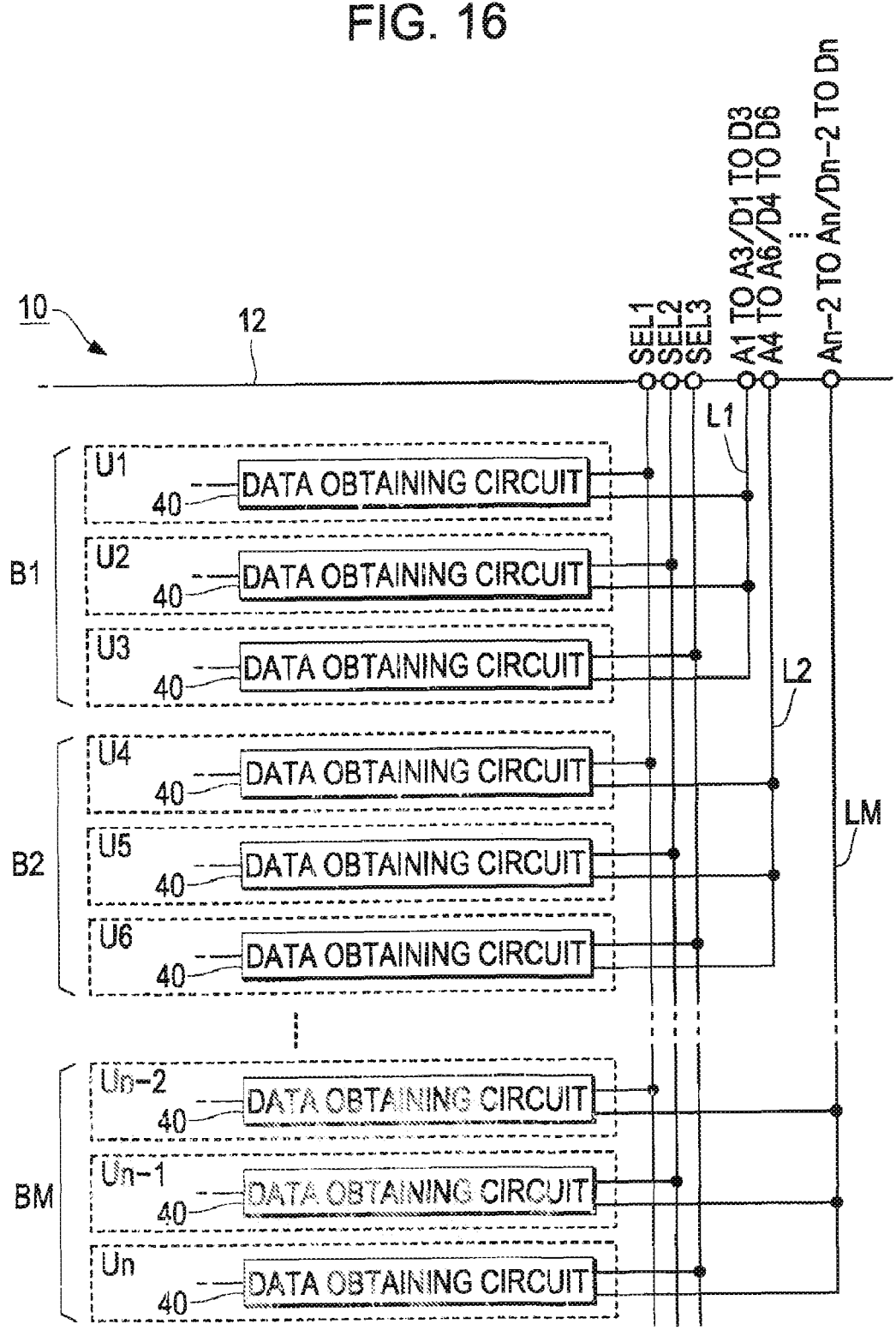
FIG. 16 is a block diagram showing the configuration of an electro-optical device according to a sixth embodiment.
Figure 17:
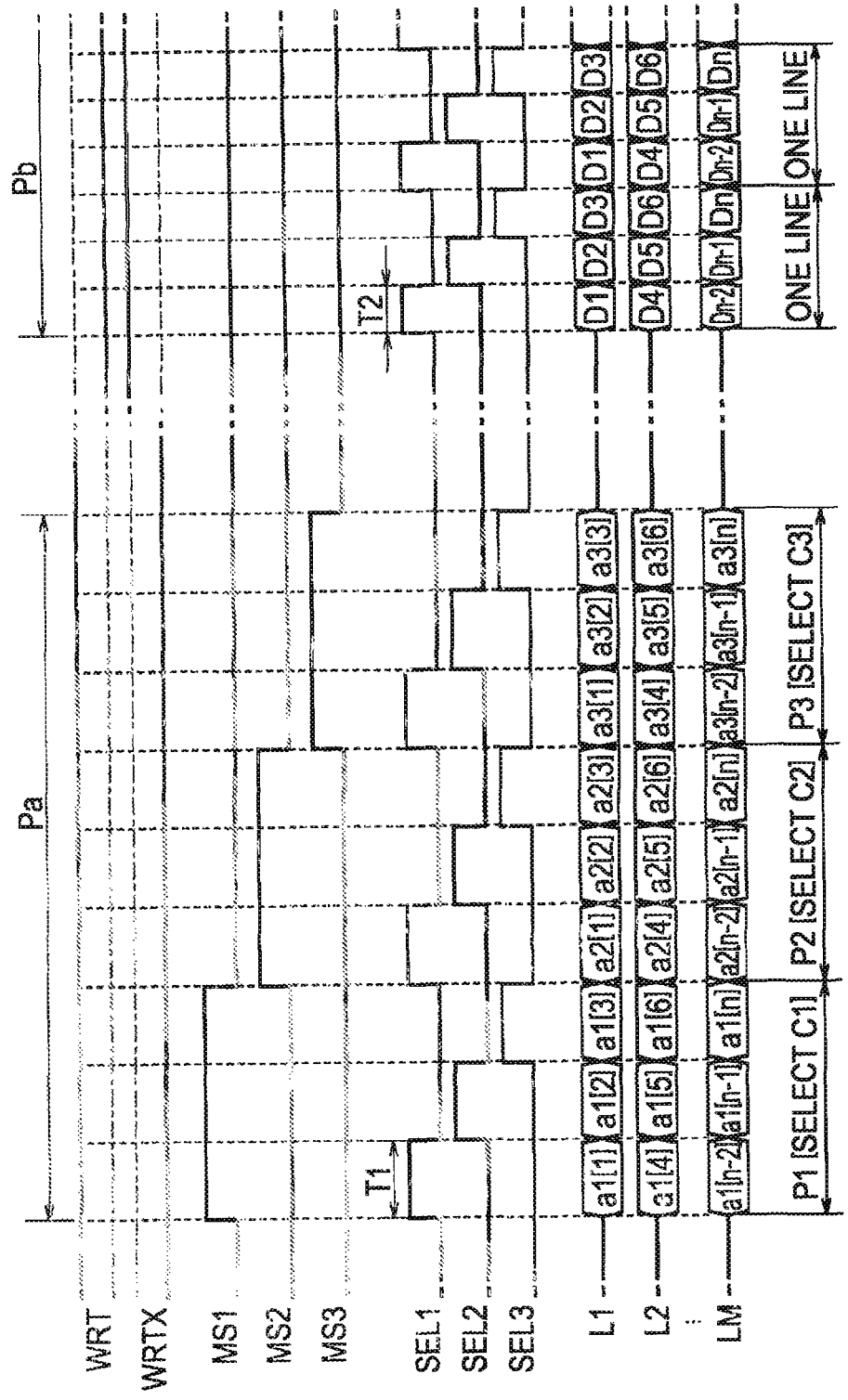
FIG. 17 is a timing chart for explaining an operation of the sixth embodiment.

FIG. 16 is a block diagram showing the configuration of an electro-optical device 10 according to this embodiment. FIG. 17 is a timing chart showing the waveforms of signals used in components of the electro-optical device 10. As shown in FIG. 16, n unit circuits U1 to Un are divided into M blocks B1 to BM of three unit circuits (M=n/3). On a surface of the substrate 12, M signal lines L1 to LM respectively associated with different blocks are formed. The signal line Lh associated with one block Bh (h is an integer satisfying $1 \leq h \leq M$) is commonly connected to the data obtaining circuits 40 (the input terminals of the transmission gates 41) of the three unit circuits U in the block Bh.

Furthermore, the first unit circuits (U1, U4, . . . , Un-2) in the individual blocks BE to BM receive a selection signal SEL1 from an upper-level device. Similarly, the second unit circuits (U2, U5, . . . , Un-1) in the individual blocks B1 to BM receive a selection signal SEL2, and the third unit circuits (U3, U6, . . . , Un) in the individual blocks BE to BM receive a selection signal SEL3. As shown in FIG. 17, the selection signals SEL1 to SEL3 sequentially change to an active level in synchronization with cycles of a predetermined period (the period T1 in the first period Pa and the period T2 in the second period Pb).

The signal line Lh receives the correction data A and the intensity data D for the individual unit circuits U in the block Bh from the upper-level device. More specifically, as shown in FIG. 17, in the first period Pa, the bits of the correction data A for the individual unit circuits U in the block Bh are sequentially supplied to the signal line Lh in synchronization with cycles of the period T1. In the second period Pb, the intensity data for the individual unit circuits U in the block Bh are sequentially supplied to the signal line Lh in synchronization with cycles of the period T2.

Through the operation described above, in the first period Pa, in response to a transition of the selection signal SEL1 to high level, the bits ak of the correction data A are obtained in parallel by the first unit circuits U (U1, U4, . . . , Un-2) in the blocks B1 to BM. Similarly, in response to a transition of the selection signal SEL2 to high level, the bits ak are obtained by the second unit circuits U (U2, U5, . . . , Un-1). Furthermore, in response to a transition of the selection signal SEL3 to high level, the bits ak are obtained by the third unit circuits U (U3, U6, . . . , Un). When the operation described above is executed in each of the periods P1 to P3, similarly to the fourth embodiment, the correction data A1 to An are stored in the unit circuits U1 to Un, respectively.

On the other hand, in the second period Pb, in response to a transition of the selection signal SEL1 to nigh level, the intensity data D (D1, D4, . . . , Dn-2) are obtained by the first unit circuits U in the blocks B1 to BM. Similarly, in response to a transition of the selection signal SEL2 to high level, the intensity data D (D2, D5, . . . , Dn-1) are obtained by the second unit circuits U. Furthermore, in response to a transition of the selection signal SEL3 to high level, the intensity data D (D3, D6, . . . , Dn) are obtained by the third unit circuits U. Through the operation described above, similarly to the fourth embodiment, the electro-optical elements E of the unit circuits U1 to Un are driven according to the intensity data D1 to Dn.

According to this embodiment, the same operation and advantage as in the fourth embodiment can be achieved. Furthermore, according to this embodiment, since data is obtained in parallel among corresponding ones of the unit circuits U in the blocks B1 to BM, advantageously, the time needed to supply the correction data A and the intensity data D to all the unit circuits U can be reduced compared with the fourth embodiment.

Modifications

Various modifications of the embodiments described above can be made. Specific examples of such modifications will be described below. These modifications may be implemented in combination as appropriate.

(1) First Modification

Obviously, the number of bits of the correction data A is not limited to that in the examples described above. Thus, the number of elements (the current-source transistors TRk, the memory elements Mak, and the NAND gates Gk) constituting each unit circuit in the first to third embodiments, or the number of the current generators Ck constituting each correcting circuit 60 in the fourth to sixth embodiments may be changed as appropriate from that in the examples described above.

Furthermore, although the intensity of each electro-optical element E is controlled as binary according to one-bit intensity data D in the exemplary embodiments described above, the intensity data D may have two or more bits. In this case, the driving current that flows through the driving transistor Tdr is controlled in a stepwise manner according to the intensity data D, so that the intensity of the electro-optical element E is controlled so as to take on one of multiple (three or more) levels. Furthermore, instead of the signal line L in the fourth embodiment or the signal lines La and Lb in the fifth embodiment, a plurality of signal lines may be provided to supply signals obtained by phase expansion (serial-to-parallel conversion) of signals (e.g., video signals) serially output from an upper-level device.

(2) Second Modification

The features of the embodiments described above may be implemented in combination as appropriate. For example, the configuration in which the correction data A and the intensity data D are obtained concurrently as in the third embodiment may be employed in combination with the configuration of the first embodiment. Furthermore, the configuration in which the correction data A is specified in the form of an analog voltage signal on the signal line L1 as in the third embodiment or the correction data A is stored by a capacitor (memory element Mb) may be employed in combination with the configuration of the second embodiment.

(3) Third Modification

Although OLEDs are used as the electro-optical elements E in the exemplary embodiments described above, the invention is also applicable to various electro-optical devices that employ other types of electro-optical elements. For example, the invention is also applicable to display devices that employ inorganic EL elements, field emission displays (FEDs), surface-conduction electron-emitter displays (SEDs), ballistic electron surface emitting displays (BSDs), and displays that employ light-emitting diodes.

Electronic Apparatuses

Next an image forming apparatus, which is an example of an electronic apparatus according to the invention, will be described with reference to FIG. 18. The image forming apparatus is a tandem full-color image forming apparatus that employs a belt intermediate transfer medium.

In the image forming apparatus, four electro-optical devices 10K, 10C, 10M, and 10Y configured the same are disposed so as to oppose four photosensitive drums 4image carriers, 110K, 110C, 110M, and 110Y configured the same, respectively. Each of the electro-optical devices 10K, 10C, 10M, and 10Y are configured the same as the electro-optical device 10 according to one of the embodiments or modifications described above.

Figure 18:
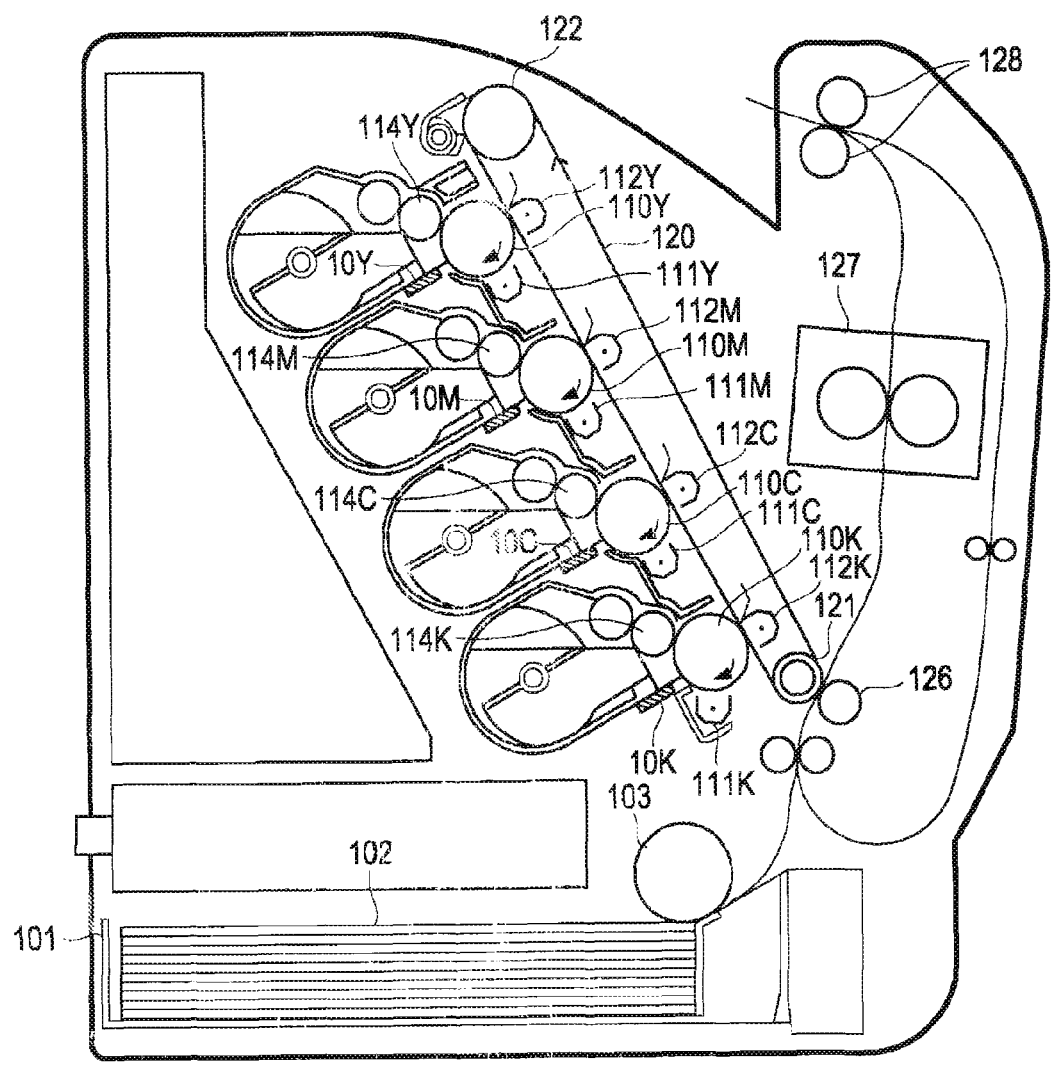
FIG. 18 a perspective view showing the configuration of an electronic apparatus (image forming apparatus) according to an embodiment of the invention.

As shown in FIG. 18, the image forming apparatus includes a driving roller 121 and a driven roller 122. On these belts 121 and 122, an endless intermediate transfer belt 120 is wound, and the intermediate transfer belt 120 is rotated around the rollers 121 and 122, as indicated by an arrow. Although not shown, a tension roller or the like may be provided to give a tension to the intermediate transfer belt 120.

Around the intermediate transfer belt 120, four photosensitive drums 110K, 110C, 110M, and 110Y, having photosensitive layers on the outer surfaces thereof, are disposed at predetermined intervals The letters "K", "C", "M", and "Y" indicates that these photosensitive drums are used to form visible images of black, cyan, magenta, and yellow. This similarly applies to other components. The photosensitive drums 110K, 110C, 110M, and 110Y are driven to rotate in synchronization with the intermediate transfer belt 120.

In the peripheries of the photosensitive drums 110K, 110C, 110M, and 110Y, corona chargers 111 (K, C, M, Y), electro-optical devices 10 (K, C, M, Y), and developing units 114 (K, C, M, Y) are provided. The corona chargers 111 (K, C, M, Y) uniformly charge image forming surfaces (outer surfaces) 110A of the respectively associated photosensitive drums 110 (K, C, M, Y). The electro-optical devices 10 (K, C, M, Y) write electrostatic latent images on the charged image forming surfaces 110A of the respective photosensitive drums 110. In each of the electro-optical devices 10 (K, C, M, Y), a plurality of electro-optical elements E is arrayed along the generating line (main scanning direction) of the photosensitive drums 110 (K, C, M, Y). The electrostatic latent images are written by irradiating the photosensitive drums 110 (K, C, M, Y) by the plurality of electro-optical elements E. The developing units 114 (K, C, M, Y) attach toner that serves as a developing agent to the electrostatic latent images, thereby forming visible images on the photosensitive drums 110 (K, C, M, Y)

The visible images of black, cyan, magenta, and yellow, respectively formed by the four single-color visible-image forming stations, are first sequentially transferred to the intermediate transfer belt 120 and are thereby superposed with each other, whereby a full-color visible image is formed. On the inner side of the intermediate transfer belt 120, four primary-transfer corotrons (transferring units) 112 (K, C, M, Y) are provided. The primary-transfer corotrons 112 (K, C, M, Y) are disposed in the proximities of the photosensitive drums 110 (K, C, M, Y), respectively. The primary-transfer corotrons 112 (K, C, M, Y) electrostatically pick up the visible images from the photosensitive drums 110 (K, C, M, Y), thereby transferring the visible images on the intermediate transfer belt 120 passing between the photosensitive drums 110 and the primary-transfer corotrons 112.

A sheet 102 as a recording medium on which an image is to be formed in the end is fed sheet by sheet by a pickup roller 103 from a feeding cassette, and is transported to a nip between the intermediate transfer belt 120 and a secondary-transfer roller 126. The full-color visible image on the intermediate transfer belt 120 is transferred at one go on one side of the sheet 102 by the secondary-transfer roller 126, and is fixed on the sheet 102 when the sheet passes through a fixing roller pair 127 that functions as a fixing unit. Then, the sheet 102 is ejected by an ejecting roller pair 128 to an ejecting cassette provided on the upper side of the image forming apparatus.

Figure 19:
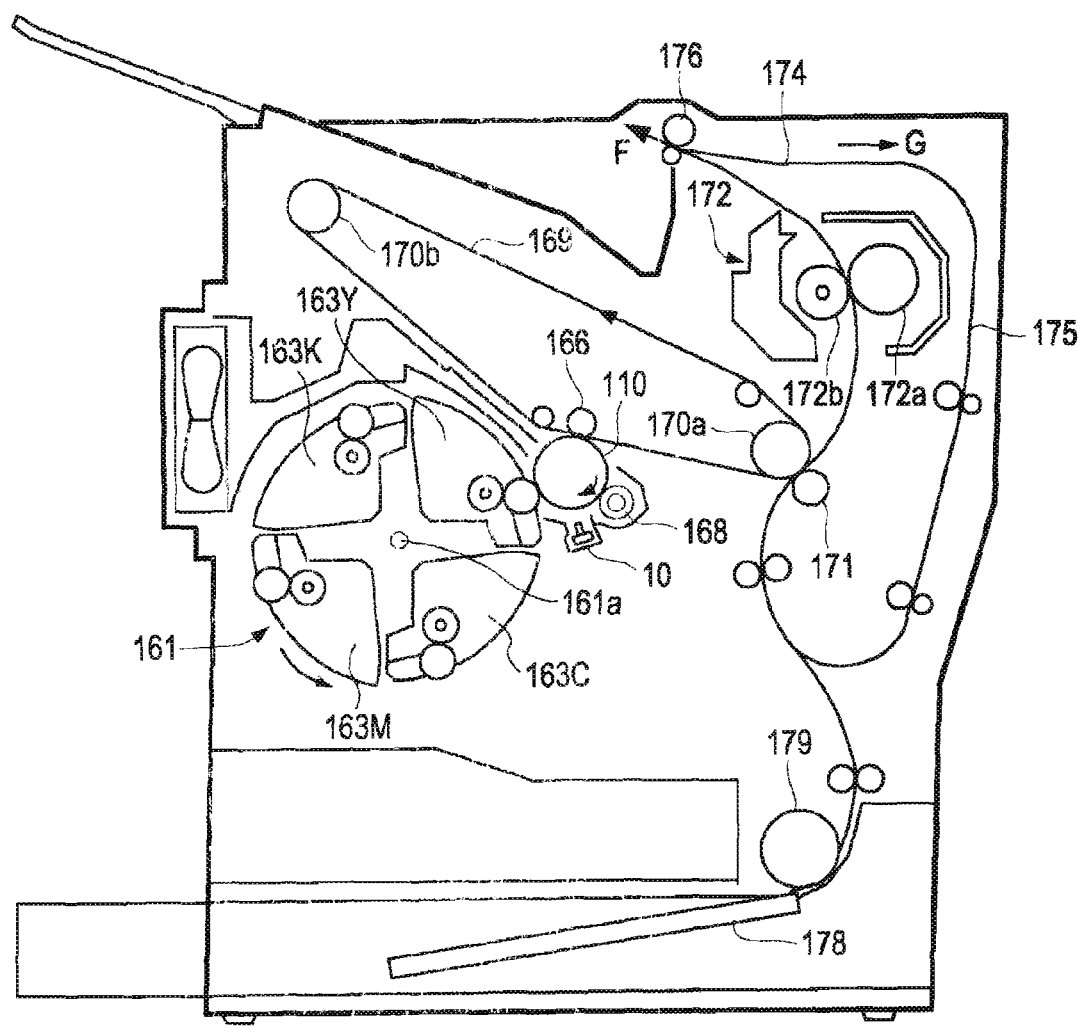
FIG. 19 a perspective view showing the configuration of an electronic apparatus (image forming apparatus) according to an embodiment of the invention.

Next, an image forming apparatus according to another embodiment of the invention will be described with reference to FIG. 19. This image forming apparatus is a rotary-development full-color image forming apparatus that employs a belt intermediate transfer medium. As shown in FIG. 19, around a photosensitive drum 110, a corona charger 168, a rotary developing unit 161, an electro-optical device 10 according to one of the embodiments or modifications described above, and an intermediate transfer belt 169 are provided.

The corona charger 168 uniformly charges the outer surface of the photosensitive drum 110. The electro-optical device 10 writes an electrostatic latent image on the charge image forming surface (outer surface) 110A of the photosensitive drum 110. In the electro-optical device 10, a plurality of electro-optical elements E is arrayed long the generating line (main scanning direction) of the photosensitive drum 110. The electrostatic latent image is written by irradiating the photosensitive drum 110 by the electro-optical elements E.

The developing unit 116 includes four developing devices 163Y, 163C, 163M, and 163K disposed at angular intervals of 90 degrees. The developing unit 161 can be rotated counter-clockwise about a shaft 161a. The developing devices 163Y, 163C, 163M, and 163K supply toners of yellow, cyan, magenta, and black to the photosensitive drum 110, respectively, so that the toners as developing agents are attached to the electrostatic latent image, whereby a visible image is formed on the photosensitive drum 110.

An endless intermediate transfer belt 169 is wound on a driving roller 170a, a driven roller 170b, a primary-transfer roller 166, and a tension roller, and is rotated around these rollers in a direction indicated by an arrow. The primary-transfer roller 166 electrostatically picks up the visible image from the photosensitive drum 110, thereby transferring the visible image to the intermediate transfer belt 169 passing between the photosensitive drum 110 and the primary-transfer roller 166.

More specifically, by a first rotation of the photosensitive drum 110, an electrostatic latent image for yellow is written by the electro-optical device 10, a visible image of yellow (Y) is formed by the developing device 163Y, and the visible image is transferred to the intermediate transfer belt 169. Then, by a second rotation of the photosensitive drum 110, an electrostatic latent image for cyan (C) is written by the electro-optical device 10, a visible image of cyan is formed by the developing device 163C, and the visible image is transferred to the intermediate transfer belt 169 so as to overlap the visible image of yellow. Through four rotations of the photosensitive drums 110 in similar manners, visible images of yellow, cyan, magenta, and black are superposed on the intermediate transfer belt 169, whereby a full-color visible image is formed on the intermediate transfer belt 169. When images are to be formed on either side of a sheet as a recording medium on which the images are to be formed in the end, a full-color visible image is formed on the intermediate transfer belt 169 by transferring visible images of one color for a top surface and a bottom surface to the intermediate transfer belt 169, transferring visible images of a next color for a top surface and a bottom surface to the intermediate transfer belt 169, and so forth.

In the image forming apparatus, a sheet transporting path 174 for transporting sheets therethrough is provided. Sheets are picked up one by one by a pickup roller 179 from a feeding cassette 178, transported long the sheet transporting path 174 by a transporting roller, and passed through a nip between the intermediate transfer belt 169 and a secondary-transfer roller 171. The secondary transfer roller 171 electrostatically picks up the full-color visible image at one go from the intermediate transfer belt 169, thereby transferring the full-color image on one side of a sheet. The secondary-transfer roller 171 can be moved toward and away from the intermediate transfer belt 169 by a clutch (not shown). When transferring the full-color visible image to the sheet, the secondary-transfer roller 171 is abutted to the intermediate transfer belt 169. On the other hand, when visible images are being superposed on the intermediate transfer belt 169, the secondary-transfer roller 171 is kept away from the intermediate transfer belt 169.

The sheet having the image transferred thereto in the manner described above is transported to a fixing unit 172, and is passed between a heating roller 172a and a pressing roller 172b of the fixing unit 172, whereby the visible image on the sheet is fixed. The sheet after the fixing is transported between the ejecting-roller pair 176 in a direction indicated by an arrow F. In the case of double-sided printing, after a large portion of the sheet has passed through the ejecting-roller pair 176, the ejecting-roller pair 176 is rotated in the reverse direction, so that the sheet is introduced to a transporting path 175 for double-sided printing, as indicated by an arrow G. Then, a visible image is transferred to the opposite surface of the sheet by the secondary-transfer roller 171, the visible image is fixed by the fixing unit, and the sheet is ejected by the ejecting-roller pair 176.

The exemplary image forming apparatuses shown in FIGS. 18 and 19 include light sources in which OLEDs are used as the electro-optical elements E. Thus, the apparatus size is reduced compared with a case where a laser scanning optical system is used. The electro-optical devices 10 according to the embodiments or modifications can also be used to electrophotographic image forming apparatuses other than the examples described above. For example, the electro-optical devices 10 according to the embodiments or modifications can also be used in an image forming apparatus of the type in which a visible image is transferred directly from a photosensitive drum to a sheet without using an intermediate transfer belt or an image forming apparatus that forms a monochrome image.

Possible applications of the electro-optical devices according to the embodiments or modifications are not limited to exposure of a photosensitive member. For example, electro-optical devices according to the embodiments or modifications can be used in an image reading device such as a scanner, as a line optical head (lighting device) that irradiates a subject of reading such as an original document. Examples of such image reading devices include scanners, reading devices in copying machines or facsimile machines, bar code readers, and two-dimensional image code readers that read two-dimensional image codes such as QR code (registered trademark). Furthermore, an electro-optical device in which a plurality of electro-optical elements (light-emitting elements in particular) is arrayed to form a surface can be used as a backlight unit provided on the back side of a liquid crystal panel.

Furthermore, the electro-optical devices according to the embodiments or modifications can also be used as image display devices. In a display device of this type, a plurality of electro-optical elements E is arrayed in a row direction and a column direction to form a matrix. A scanning-circuit driving circuit selects each row in a unit period (horizontal scanning period) so that correction data A or intensity data D is supplied to the electro-optical elements E or the selected row. Examples of electronic apparatuses in which the electro-optical devices according to the embodiments or modifications can be used for image display include portable personal computer, cellular phones, personal digital assistants (PDAs), digital still cameras, television sets, video cameras, car navigation units, pagers, electronic notebooks, electronic papers, electronic calculators, word processors, work stations, video phones, points of sales (POS) terminals, printers, scanners, copying machines, video players, and apparatuses having touch panels.

What is claimed is:

1. An electro-optical device comprising:
   a plurality of unit circuits;
   a first selecting circuit that sequentially selects the plurality of unit circuits;
   a first signal line through which correction data for the individual unit circuits are supplied serially;
   a second selecting circuit that sequentially selects the plurality of unit circuits; and
   a second signal line through which intensity data for the individual unit circuits are supplied serially;
   wherein each of the plurality of unit circuits includes:
      an electro-optical element that exhibits an intensity corresponding to a driving current;
      a storage circuit that obtains correction data from the first signal line when the first selecting circuit selects the unit circuit and that stores the correction data;
      a control circuit that controls the driving current supplied to the electro-optical element according to intensity data specifying the intensity exhibited by the electro-optical element and the correction data stored in the storage circuit; and
   wherein each of the plurality of unit circuits includes an extracting circuit that obtains intensity data from the second signal line when the second selecting circuit selects the unit circuit, and the control circuit controls the driving current on the basis of the intensity data obtained by the extracting circuit and the correction data stored in the storage circuit.

2. The electro-optical device according to claim 1, wherein the first selecting circuit selects each of the plurality of unit circuits in a first period, and the second selecting circuit selects each of the plurality of unit circuits in a second period that is different from the first period.

3. The electro-optical device according to claim 1, wherein the selection of each of the plurality of unit circuits by the first selecting circuit and the selection of each of the plurality of unit circuits by the second selecting circuit are executed concurrently.

4. The electro-optical device according to claim 1, wherein a period of the selection of each of the plurality of unit circuits by the first selecting circuit is longer than a period of the selection of each of the plurality of unit circuits by the second selecting circuit.

5. An electro-optical device comprising:
   a plurality of unit circuits;
   a first selecting circuit that sequentially selects the plurality of unit circuits;
   a first signal line through which correction data for the individual unit circuits are supplied serially; and
   a second signal line through which intensity data for the individual unit circuits are supplied serially;
   wherein each of the plurality of unit circuits includes:
      an electro-optical element that exhibits an intensity corresponding to a driving current;
      a storage circuit that obtains correction data from the first signal line when the first selecting circuit selects the unit circuit and that stores the correction data; and
      a control circuit that controls the driving current supplied to the electro-optical element according to intensity data specifying the intensity exhibited by the electro-optical element and the correction data stored in the storage circuit;
   wherein each of the plurality of unit circuits includes:
      an extracting circuit that obtains intensity data from the second signal line when the second selecting circuit selects the unit circuit; and
      a path specifying circuit that specifies either the storage circuit or the extracting circuit when the first selecting circuit selects the unit circuit;
   wherein the storage circuit obtains the correction data from the first signal line and stores the correction data when the storage circuit is specified by the path specifying circuit, and the extracting circuit obtains the intensity data from the second signal line when the extracting circuit is specified by the path specifying circuit, and
   wherein the control circuit controls the driving current on the basis of the intensity data obtained by the extracting circuit and the correction data stored in the storage circuit.

6. The electro-optical device according to claim 5, wherein a transmission frequency of the correction data on the first signal line is lower than a transmission frequency of the intensity data on the second signal line.

7. An electro-optical device comprising:
   a plurality of unit circuits;
   a first selecting circuit that sequentially selects the plurality of unit circuits; and
   a first signal line through which correction data for the individual unit circuits are supplied serially;
   wherein each of the plurality of unit circuits includes:
      an electro-optical element that exhibits an intensity corresponding to a driving current;
      a storage circuit that obtains correction data from the first signal line when the first selecting circuit selects the unit circuit and that stores the correction data; and
      a control circuit that controls the driving current supplied to the electro-optical element according to intensity data specifying the intensity exhibited by the electro-optical element and the correction data stored in the storage circuit; and
   wherein the correction data is specified by a value of a voltage on the first signal line, the storage circuit of each of the plurality of unit circuits includes a capacitor that stores, as the correction data, the voltage on the first signal line at a time of selection of the unit circuit by the first selecting circuit, and the control circuit controls the driving current on the basis of the intensity data and the voltage stored in the capacitor.

8. The electro-optical device according to claim 7, wherein the first selecting circuit selects the individual unit circuits in periods that are separated by predetermined intervals.

9. An electro-optical device comprising:
 a plurality of unit circuits;
 a first selecting circuit that sequentially selects the plurality of unit circuits; and
 a first signal line through which correction data for the individual unit circuits are supplied serially;
wherein each of the plurality of unit circuits includes:
 an electro-optical element that exhibits an intensity corresponding to a driving current;
 a storage circuit that obtains correction data from the first signal line when the first selecting circuit selects the unit circuit and that stores the correction data; and
 a control circuit that controls the driving current supplied to the electro-optical element according to intensity data specifying the intensity exhibited by the electro-optical element and the correction data stored in the storage circuit;
wherein the control circuit includes:
 a current generating circuit that generates a reference current having a current value corresponding to the correction data stored in the storage circuit; and
 a driving unit that generates the driving current by adjusting the reference current generated by the current generating circuit to a current value corresponding to the intensity data; and
wherein the driving unit includes a driving transistor disposed on a path of the reference current, the driving transistor having a gate to which a voltage corresponding to the intensity data is applied.

* * * * *